(12) United States Patent
Dhuppad et al.

(10) Patent No.: US 12,502,489 B1
(45) Date of Patent: Dec. 23, 2025

(54) METERED DOSE INHALER FOR IPRATROPIUM BROMIDE SOLUTION

(71) Applicant: Glenmark Pharmaceuticals Limited, Maharashtra (IN)

(72) Inventors: Ulhas Dhuppad, Maharashtra (IN); Raveendra Pai, Maharashtra (IN); Michael Crick, Glen Rock, NJ (US); Ashok Katkurwar, Maharashtra (IN); Jitendra Patil, Maharashtra (IN); Rakshit Trivedi, Maharashtra (IN); Ramakant Chanagare, Maharashtra (IN)

(73) Assignee: GLENMARK PHARMACEUTICALS LIMITED, Mumbai (IN)

( * ) Notice: Subject to any disclaimer, the term of this patent is extended or adjusted under 35 U.S.C. 154(b) by 0 days.

(21) Appl. No.: 18/944,931

(22) Filed: Nov. 12, 2024

(30) Foreign Application Priority Data

Sep. 14, 2024 (IN) .............................. 202421069699

(51) Int. Cl.
*A61M 15/00* (2006.01)
*A61K 9/00* (2006.01)
(Continued)

(52) U.S. Cl.
CPC .......... *A61M 15/0021* (2014.02); *A61K 9/008* (2013.01); *A61K 31/439* (2013.01);
(Continued)

(58) Field of Classification Search
CPC .............. A61K 2300/00; A61K 31/335; A61K 31/506; A61K 31/55; A61K 31/56; A61K 31/57; A61K 31/58; A61K 31/724; A61K 45/06; A61K 47/06; A61K 47/40; A61K 9/0043; A61K 9/0048; A61K 9/008; A61K 9/08; A61M 11/001; A61M 11/02; A61M 15/0003; A61M 15/002; A61M 15/003; A61M 15/0061; A61M 15/0065; A61M 15/0068; A61M 15/009; A61M 15/0091;
(Continued)

(56) References Cited

U.S. PATENT DOCUMENTS 5,676,930 A * 10/1997 Jager ........................ A61P 11/08
424/45
8,464,914 B2 * 6/2013 Lulla ....................... B65D 83/52
222/402.2
(Continued)

FOREIGN PATENT DOCUMENTS

| CN | 112438966 A | * | 3/2021 | ........... A61K 31/439 |
| WO | 03002169 A2 | | 1/2003 | |
| WO | 2020070620 A2 | | 4/2020 | |

*Primary Examiner* — Annette Dixon
(74) *Attorney, Agent, or Firm* — Blank Rome LLP

(57) ABSTRACT

The present invention relates to a metered dose inhaler device comprising a stable inhalable composition of ipratropium bromide, contained in a canister fitted with a metering valve, an actuator and a dose indicator. The present invention also relates to a process for preparing such a pharmaceutical composition and its use in the treatment of respiratory disorders such as for the maintenance treatment of bronchospasm associated with chronic obstructive pulmonary disease (COPD), including chronic bronchitis and emphysema in a subject in need thereof (e.g., a human).

22 Claims, 12 Drawing Sheets

(51) Int. Cl.
*A61K 31/439* (2006.01)
*A61K 47/06* (2006.01)
*A61K 47/10* (2017.01)
*A61K 47/12* (2006.01)

(52) U.S. Cl.
CPC .............. *A61K 47/06* (2013.01); *A61K 47/10* (2013.01); *A61K 47/12* (2013.01)

(58) Field of Classification Search
CPC .............. A61M 15/0093; A61M 15/08; A61M 2202/04; A61M 2202/0468; A61M 2202/064; A61M 2205/0238; A61M 2205/073; A61M 2205/583; A61M 2205/7509; A61M 2205/7518; A61M 2205/7545; A61M 2206/16; A61M 2209/02; A61M 2209/045; A61M 2210/0618; A61M 2210/0625; A61M 2210/065; A61M 2210/0662; A61M 2210/1089; A61M 2210/1475; A61M 31/00; A61P 11/00; A61P 11/06; A61P 11/08; B05B 1/002; B05B 11/061; B05B 11/062; B05B 11/1043; B05B 11/105; B65D 2583/005; B65D 83/00; B65D 83/14; B65D 83/303; B65D 83/36; B65D 83/38; B65D 83/386; B65D 83/44; B65D 83/48; B65D 83/52; B65D 83/56; B65D 83/7532; C08L 23/16

See application file for complete search history.

(56) References Cited

U.S. PATENT DOCUMENTS

| | | | |
|---|---|---|---|
| 9,937,306 B2 | 4/2018 | Wachtel et al. | |
| 10,421,599 B2* | 9/2019 | Jacuk | B65D 83/52 |
| 2009/0020114 A1* | 1/2009 | Brambilla | A61P 11/00 |
| | | | 128/200.23 |
| 2009/0312724 A1* | 12/2009 | Pipkin | A61K 31/724 |
| | | | 128/207.18 |
| 2016/0129205 A1* | 5/2016 | Shahaf | B05B 11/061 |
| | | | 128/200.23 |
| 2022/0257878 A1* | 8/2022 | Berry | A61K 47/06 |
| 2023/0271770 A1* | 8/2023 | Zhang | A61M 15/009 |
| | | | 128/200.23 |
| 2025/0050040 A1* | 2/2025 | Berry | A61K 47/06 |

\* cited by examiner

METERED DOSE INHALER FOR IPRATROPIUM BROMIDE SOLUTION

This patent application claims priority to Indian Patent Application number 202421069699 filed Sep. 14, 2024 the contents of which are incorporated by reference herein.

FIELD OF THE INVENTION

The present invention relates to a metered dose inhaler device comprising a stable inhalable composition of ipratropium bromide, contained in a canister fitted with a metering valve, an actuator and a dose indicator. The present invention also relates to a process for preparing such an inhalable composition and its use in the treatment of respiratory disorders such as for the maintenance treatment of bronchospasm associated with chronic obstructive pulmonary disease (COPD), including chronic bronchitis and emphysema in a subject in need thereof (e.g., a human).

BACKGROUND OF THE INVENTION

Metered dose inhalers (MDIs) are important and well-known devices used to provide effective treatment for many respiratory diseases. In MDIs, the composition for treating respiratory disorders are administered in the form of aerosols dispensed as solutions or suspensions of drugs mixed with liquefied gases known as propellants. Since solution compositions provide smaller mass median aerodynamic diameter (MMAD) resulting in delivery to the entire lung including the alveolar regions.

However, a significant challenge associated with solution compositions is the chemical stability of the active ingredients. The loss of active substance content should be minimized during the shelf-life and the appearance of degradative product should be diminished so that the medicament can be used with its effectiveness and safety. It means, the physical and chemical stability as well as the maintenance of the quality parameters during the shelf-life of the aerosol are of essential importance for its practical medical use. It is known in the art that the stability of active pharmaceutical ingredients can, in many cases, be enhanced by minimizing the amount of water in the aerosol composition, for example, by excluding water from the manufacturing process and then sealing the inhaler in a water-resistant pouch, such as a foil pouch, often with a desiccant inside the pouch, to prevent uptake of water from the environment. However, recently it was recognized that some pharmaceutically active agents are not stable when the water level is too low. For example, some active pharmaceutical ingredients are in the form of hydrates. When the water level is too low, the hydrate can partially or totally dehydrate. The partially or totally dehydrated active pharmaceutical ingredient can either be pharmaceutically unacceptable or can further degrade.

The administration of aerosol solution compositions by a MDI device is dependent on the propellant force of the propulsion system used to produce them. One challenge associated with MDI devices is medicament accumulation and/or deposition in the actuator, which can result in concomitant reduction in the dose causing variations and inconsistencies of the actual dose administered, blockage of the spray orifice, and medicament deposition.

International Publication No. WO 2020/070620 discloses a stable composition of anhydrous micronized ipratropium or a pharmaceutically acceptable anhydrous salt thereof.

International Publication No. WO 03/002169 discloses a metered dose aerosol actuator having a generally cylindrical housing which includes a mouthpiece. The housing includes a stem block for receiving and seating a valve stem of a pressurized medicament container. The stem block includes an internal cavity provided with an outlet channel which terminates on the external surface of the stem block with a spray orifice which is directed towards the mouthpiece. The valve stem, internal cavity, outlet channel and spray orifice form a continuous path.

U.S. Pat. No. 9,937,306 relates to pharmaceutical active substances, active substance mixtures and formulations for use as an aerosol in propellant containing metered-dose aerosols.

There is a need for improved delivery systems for ipratropium bromide.

SUMMARY OF THE INVENTION

The present invention described herein is related to a MDI provided with a stable inhalable composition of ipratropium or a pharmaceutically acceptable salt(s) thereof. One embodiment is a metered dose inhaler for delivering ipratropium bromide comprising: (i) a canister fitted with a metering valve comprising an inhalable composition of ipratropium bromide and HFA-134a propellant; and (ii) an actuator, where the actuator has one or more of the following parameters: (a) the actuator has a sump volume of about 11.55 mm$^3$ to about 22.25 mm$^3$, (b) the nozzle bore (which may be referred to interchangeably herein as a spray orifice) has a diameter (which may be referred to herein interchangeably as a diameter of the nozzle bore or a spray orifice diameter) of about 0.2 mm to about 0.5 mm, or (c) the nozzle bore has a length (which may be referred to interchangeably herein as a length of the nozzle bore or a jet length) of about 0.25 mm to about 0.95 mm.

In one embodiment, the actuator comprises a body for receiving the canister and a metering valve, and a mouthpiece through which aerosolized canister content can be dispensed, the body comprises a stem block which comprises a metering valve stem receptacle and a sump which leads, via a nozzle bore, to a funnel-shape nozzle opening leading to the mouthpiece, with a proximal end of an inclined face extending immediately adjacent the receptacle and from which the nozzle bore extends generally centrally and towards, but not at, a distal end of the inclined face. In one embodiment, the axis of the nozzle bore is generally perpendicular to the inclined face.

One embodiment is a metered dose inhaler for delivering ipratropium bromide. The metered dose inhaler comprises a canister comprising an inhalable composition of ipratropium bromide and HFA-134a propellant; a metering valve fitted to and in fluid communication with the canister; and an actuator that holds the canister and the metering valve. The actuator comprises a mouthpiece through which the inhalable composition is configured to be dispensed; and a stem block. The stem block comprises a metering valve stem receptacle. The sump comprises an inclined face with a proximal end and a distal end. The stem block further comprises a nozzle bore in fluid communication with the sump. The nozzle bore has a central axis that extends generally orthogonally from the inclined face between the proximal end of the inclined face and the distal end of the inclined face. The stem block further comprises a conical nozzle opening in fluid communication with the nozzle bore and with the mouthpiece. The sump has a volume that is about 11.55 mm$^3$ to about 22.25 mm$^3$. The nozzle bore has a diameter that is about 0.2 mm to about 0.5 mm. The nozzle bore has a length that is about 0.25 mm to about 0.95 mm.

The present invention can further be described for a stable inhalable composition of ipratropium or a pharmaceutically acceptable salt(s) thereof, wherein the composition described herein is stable and provides lesser amount of related substance during shelf life. The composition of the present invention is an aerosolable composition with standard propellant known in the literature and the composition further comprises a cosolvent, a stabilizer, and the composition may optionally comprise one or more excipient(s) such as water.

Further, in certain embodiments, the MDI has one or more of the following parameter(s) (i) sump volume, (ii) sump diameter, (iii) orifice diameter, (iv) jet length, (v) stem block, (vi) cone angle, to deliver aerosolable composition. The parameter(s) mentioned herein are crucial for delivering the composition to subject.

Embodiments of the present invention are further described herein as follows:

The present invention in one embodiment relates to a MDI device comprising a canister fitted with a metering valve comprising an inhalable composition of ipratropium bromide and a propellant selected from a hydrofluorocarbon i.e., HFA-134a or a HFA-227ea.

In some embodiments, the inhalable composition of present invention comprises ipratropium, a cosolvent, a vehicle, a stabilizer, and a propellant; wherein the composition is a stable pharmaceutical composition.

In an embodiment, the present invention is related to a MDI device comprising i) a canister fitted with a metering valve comprising a stable inhalable composition of ipratropium bromide; ii) an actuator and iii) optionally, a dose indicator is fitted with the actuator; wherein the actuator has a) a sump volume is about from about 11.55 mm$^3$ to about 22.25 mm$^3$, b) a spray orifice diameter is about 0.2 mm to about 0.5 mm, and c) a jet length is about 0.25 mm to about 0.95 mm.

The invention in one embodiment relates a MDI device comprising i) a canister fitted with a metering valve comprising an inhalable composition: a stable inhalable composition comprising: (a) ipratropium bromide; (b) a cosolvent; (c) a stabilizer; and (d) hydrofluoroalkane (HFA) as a propellant, ii) an actuator and iii) optionally, a dose indicator, wherein the actuator has sump volume in range of from about 11.55 mm$^3$ to about 22.25 mm$^3$.

The invention in one embodiment relates a MDI device comprising i) a canister fitted with a metering valve comprising a stable inhalable composition comprising (a) ipratropium bromide; (b) a cosolvent; (c) a stabilizer, and (d) HFA as a propellant; ii) an actuator and iii) optionally, a dose indicator, wherein the actuator has sump volume in range of from about 11.55 mm$^3$ to about 12.8 mm$^3$.

Another embodiment relates to a MDI device comprising i) a canister fitted with a metering valve comprising a stable inhalable composition comprising ipratropium bromide, ii) an actuator and iii) optionally a dose indicator wherein the actuator has sump volume in range of from about 12.8 mm$^3$ to about 14.5 mm$^3$.

Another embodiment relates to a MDI device comprising a canister fitted with a metering valve comprising a stable inhalable composition ipratropium bromide, an actuator and a dose indicator wherein the actuator has sump volume in range of from about 14.6 mm$^3$ to about 18 mm$^3$.

Another embodiment relates to a MDI device comprising a canister fitted with a metering valve comprising a stable inhalable composition ipratropium bromide, an actuator and a dose indicator wherein the actuator has sump volume in range of from about 18.1 mm$^3$ to about 22.25 mm$^3$.

In some embodiments, the spray orifice diameter of actuator of the MDI device is from about 0.2 mm to about 0.5 mm.

Another embodiment relates to a MDI device comprising i) a canister fitted with a metering valve comprising a stable inhalable composition comprising: ipratropium bromide, ii) an actuator, and iii) optionally, a dose indicator; wherein the actuator has orifice diameter in range of from about 0.2 mm to about 0.5 mm Another embodiment relates to a MDI device comprising i) a canister fitted with a metering valve comprising a stable inhalable composition comprising ipratropium bromide, ii) an actuator, and iii) optionally, a dose indicator; wherein the actuator has orifice diameter in range of from about 0.22 mm to about 0.4 mm Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter in range of from about 0.22 mm to about 0.34 mm Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter in range of from about 0.35 mm to about 0.5 mm.

In some embodiments, the jet length of the actuator of the MDI is about 0.25 mm to about 0.95 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.25 mm to about 0.95 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.25 mm to about 0.45 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.46 mm to about 0.64 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length about 0.65 mm to about 0.95 mm.

The MDI device of the present invention further optionally comprises a dose indicator which is fitted in the actuator.

The inhalable composition according to the present invention comprising (a) ipratropium bromide; (b) a cosolvent; (c) a stabilizer, and (d) hydrofluoroalkane (HFA) as a propellant.

In some embodiments, the inhalable composition is a stable inhalable composition comprising (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water and (e) a propellant that is HFA-134a.

In an embodiment, the present invention relates to a method of treating a respiratory disorder in a subject in need thereof; the method comprises administering to the subject inhalable composition of ipratropium bromide using the MDI device described herein.

In an embodiment, the present invention also relates to a method of administering a stable inhalable composition of the present invention to a subject in need thereof; wherein the method comprises administering the composition using the MDI device described herein.

The amount of drug in an aerosol solution composition that can be delivered through the valve of an MDI will depend on the active ingredient concentration in the composition and the metering volume of the valve. Commonly used valve sizes are 25, 50, 63 and 100 µl.

The MDI of the present invention comprising i) a canister fitted with a metering valve comprising a stable inhalable composition of ipratropium bromide; ii) an actuator and iii) optionally, a dose indicator is fitted with the actuator; provides a mean median aerodynamic diameter (MMAD) of Ipratropium bromide is about 2 µm to about 4 µm.

The MDI device of the present invention comprising i) a canister fitted with a metering valve comprising a stable inhalable composition of ipratropium bromide; ii) an actuator and iii) optionally, a dose indicator is fitted with the actuator; provides a mean median aerodynamic diameter (MMAD) of Ipratropium bromide is about 0.5 µm to about 1.5 µm.

The MDI device of the present invention comprising i) a canister fitted with a metering valve comprising a stable inhalable composition of ipratropium bromide; ii) an actuator and iii) optionally, a dose indicator is fitted with the actuator; provides a fine particle fraction (FPF) of ipratropium bromide is about 30% to about 50%.

The MDI device of the present invention comprising i) a canister fitted with a metering valve comprising a stable inhalable composition of ipratropium bromide; ii) an actuator and iii) optionally, a dose indicator is fitted with the actuator; provides a fine particle fraction (FPF) of ipratropium bromide is about 15% to about 60%.

The MDI device of the present invention comprising i) a canister fitted with a metering valve comprising a stable inhalable composition of ipratropium bromide; ii) an actuator and iii) optionally, a dose indicator is fitted with the actuator; provides a fine particle dose (FPD) of ipratropium bromide is about 3 µg to about 9 µg.

The MDI device of the present invention comprising i) a canister fitted with a metering valve comprising a stable inhalable composition of ipratropium bromide; ii) an actuator and iii) optionally, a dose indicator is fitted with the actuator; provides a fine particle dose (FPD) of ipratropium bromide is about 3 µg to about 10µ g.

In another embodiment, a stable inhabale solution composition of ipratropium bromide of the present invention is prepared and filled in the appropriate canister. In one embodiment, the filling method comprises the following steps:

1. Ethanol, purified water and anhydrous citric acid were mixed in manufacturing vessel.
2. Ipratropium bromide was added into solution from step-1 and mixed well.
3. The propellant, HFA-134a was added in the manufacturing vessel followed by mixing and re-circulation of the mixture.
4. The solution obtained in Step-3 was filled into crimped canisters provided with a suitable valve.

Yet another embodiment, relates to a method of treating a respiratory disorder, such as asthma or COPD, in a subject (e.g., a human subject in need thereof) comprising administering the pharmaceutical composition as described herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the various embodiments of the invention.

DETAILED DESCRIPTION OF THE INVENTION

Figure 1:
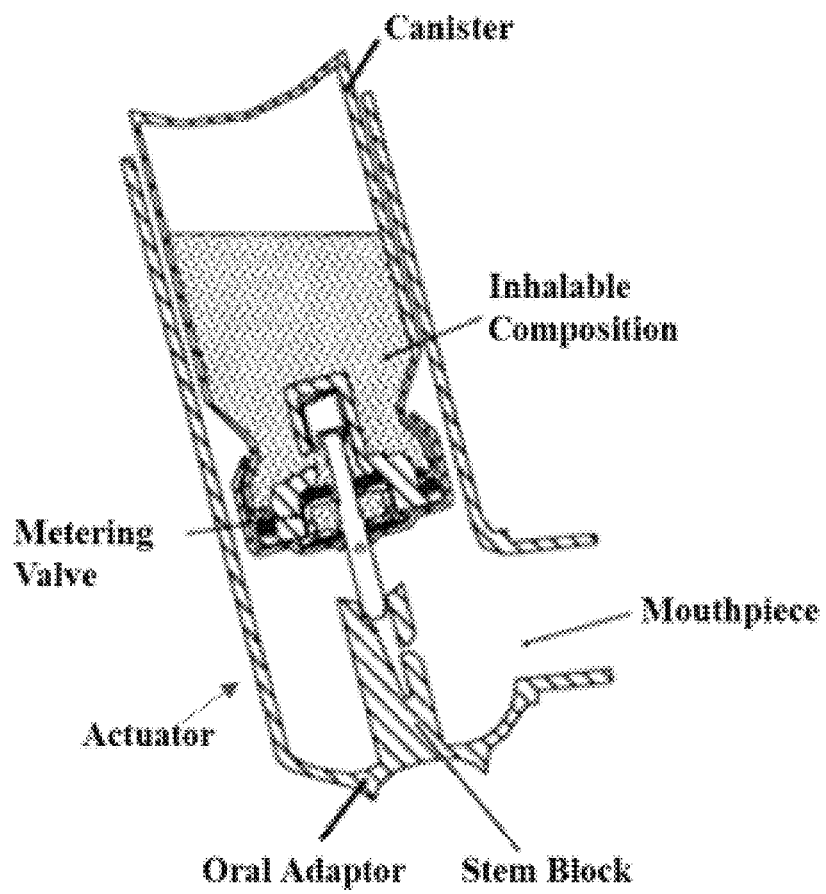
FIG. 1 shows a side view of a MDI device, according to the embodiments of the present invention.
Figure 2A:
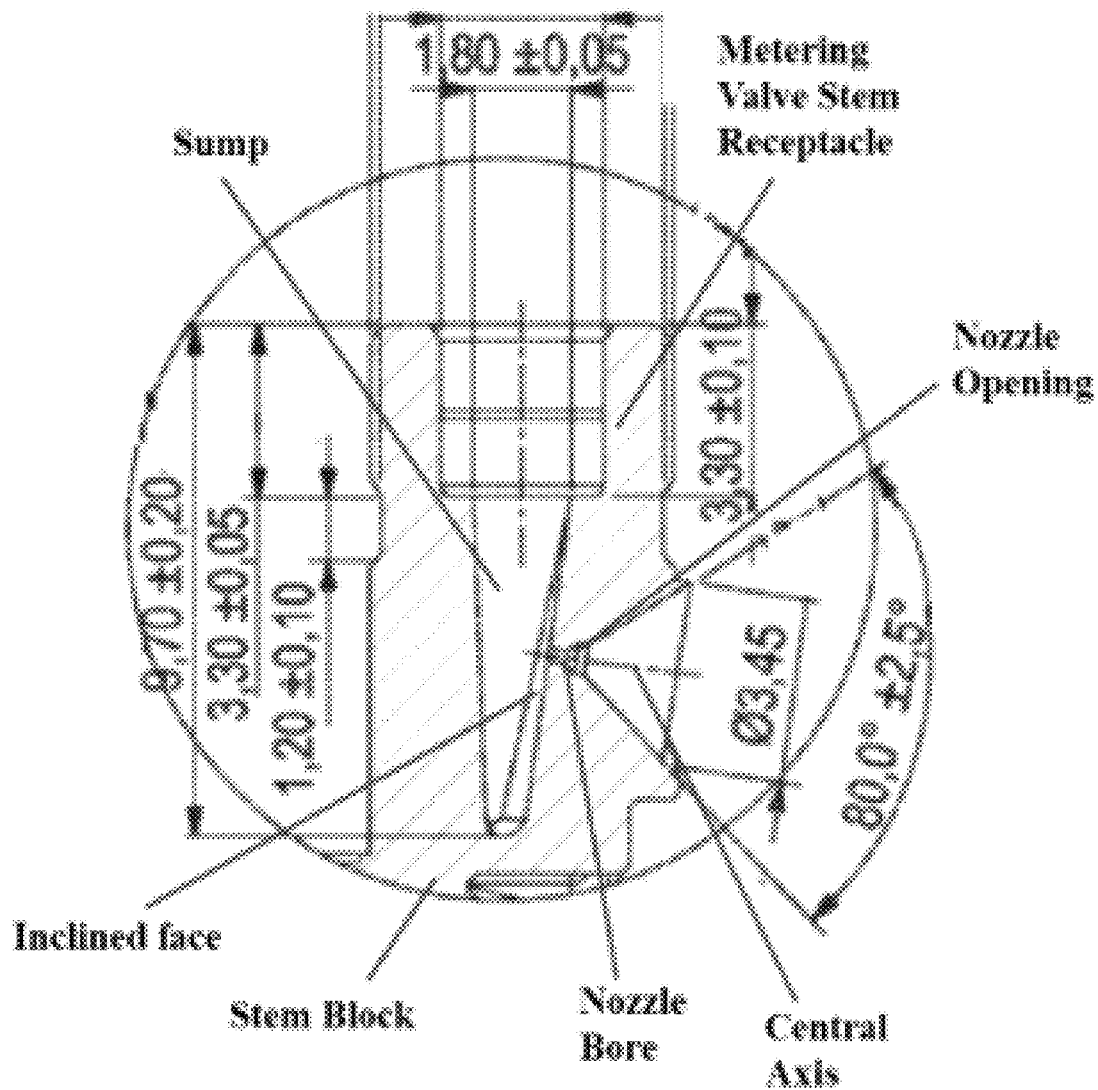
FIG. 2a-2c show different expanded views of the actuator (e.g., of a stem block of the actuator) according to present invention.
Figure 2B:
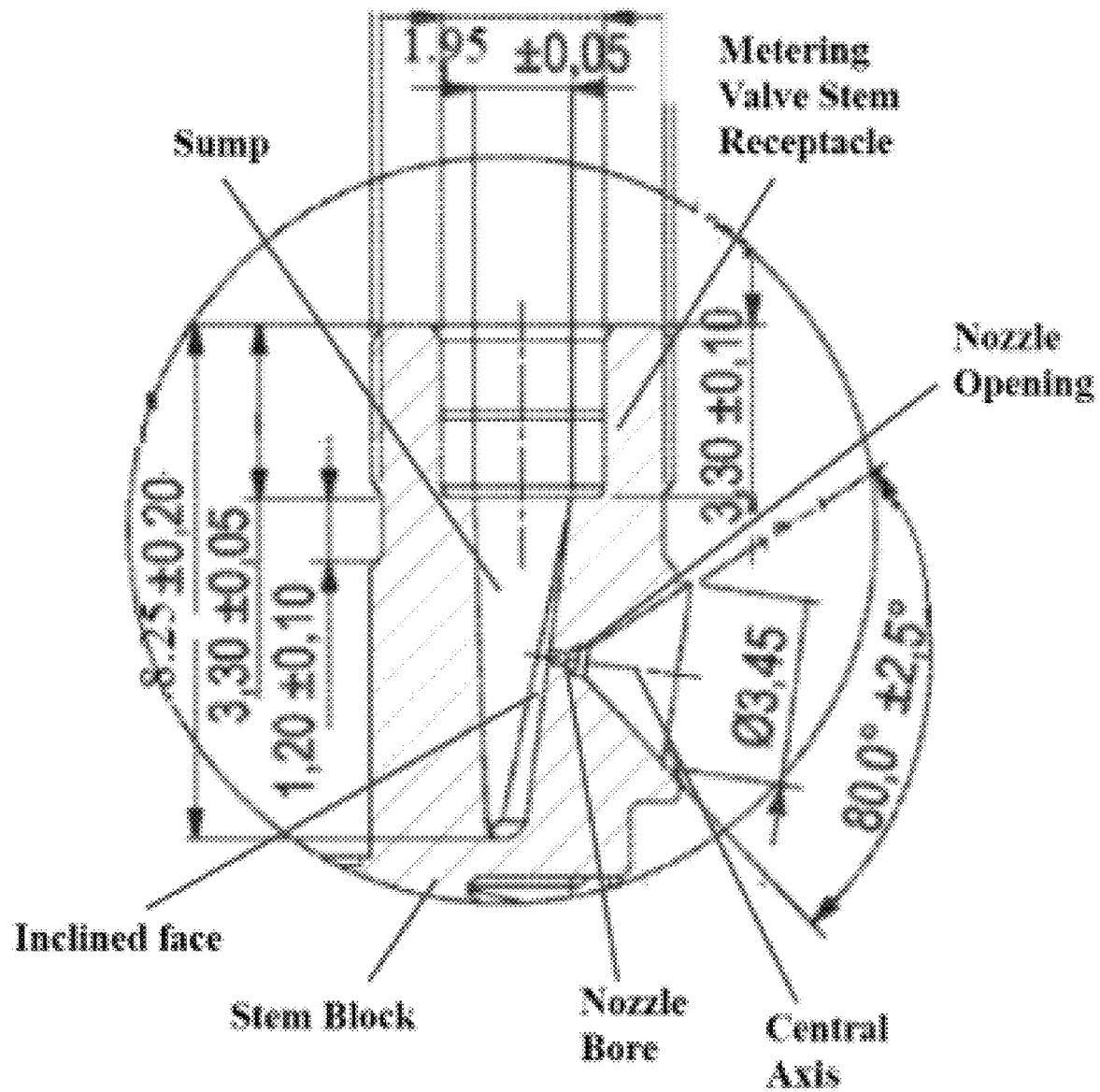
Figure 2C:
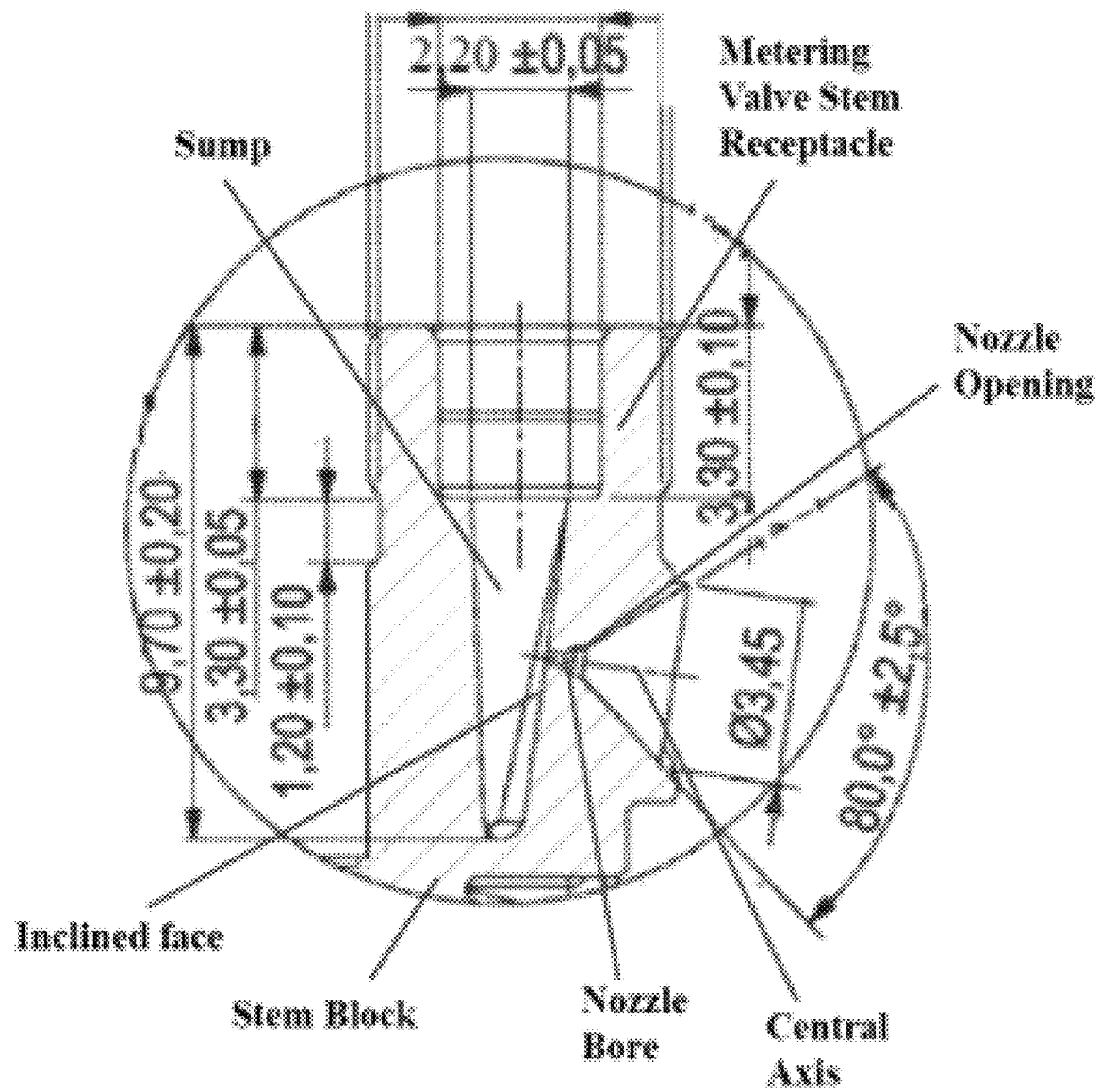
Figure 3:
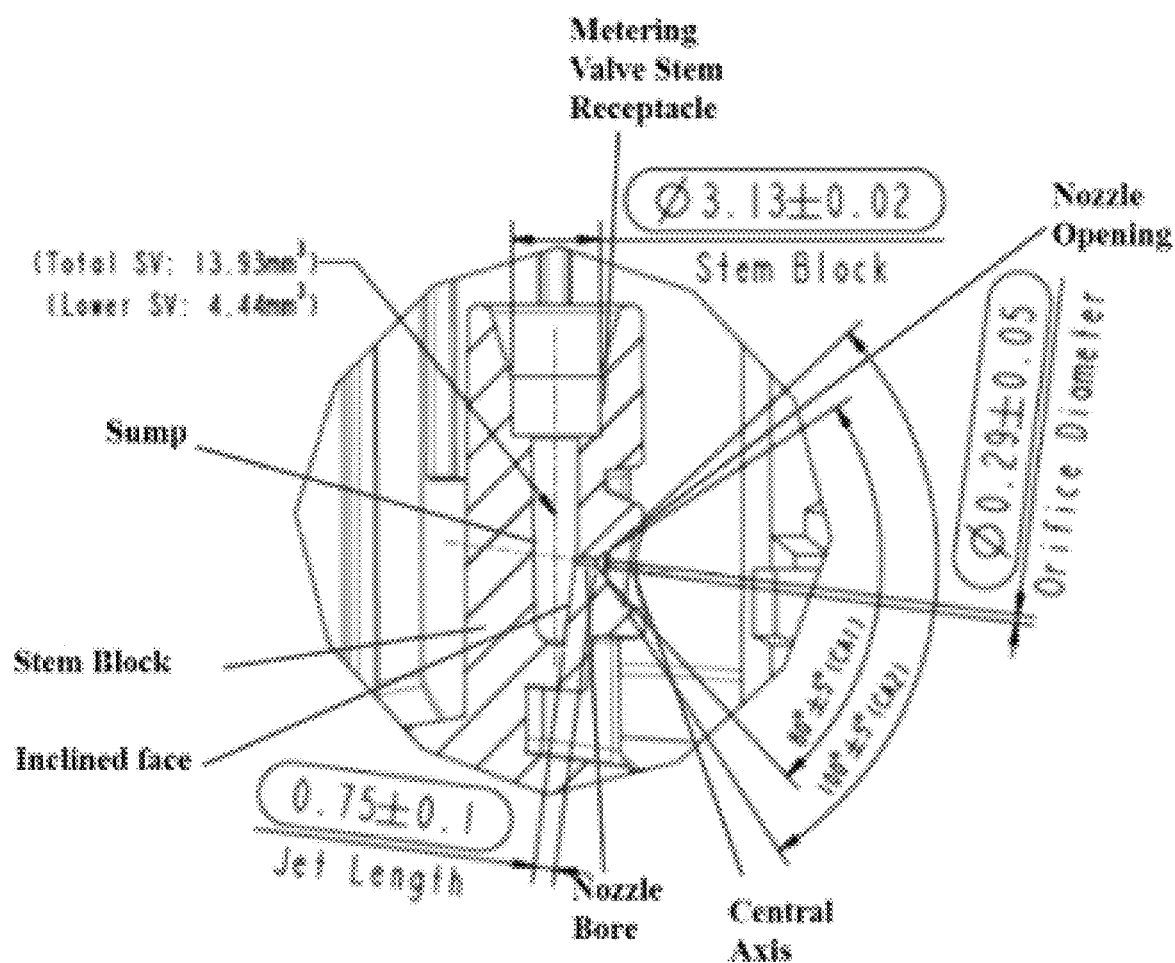
FIG. 3 is an enlarged view of an actuator (e.g., of a stem block of the actuator) with a sump volume of about 13.93 mm$^3$, orifice diameter of about 0.29 mm, and jet length of about 0.75 mm.
Figure 4:
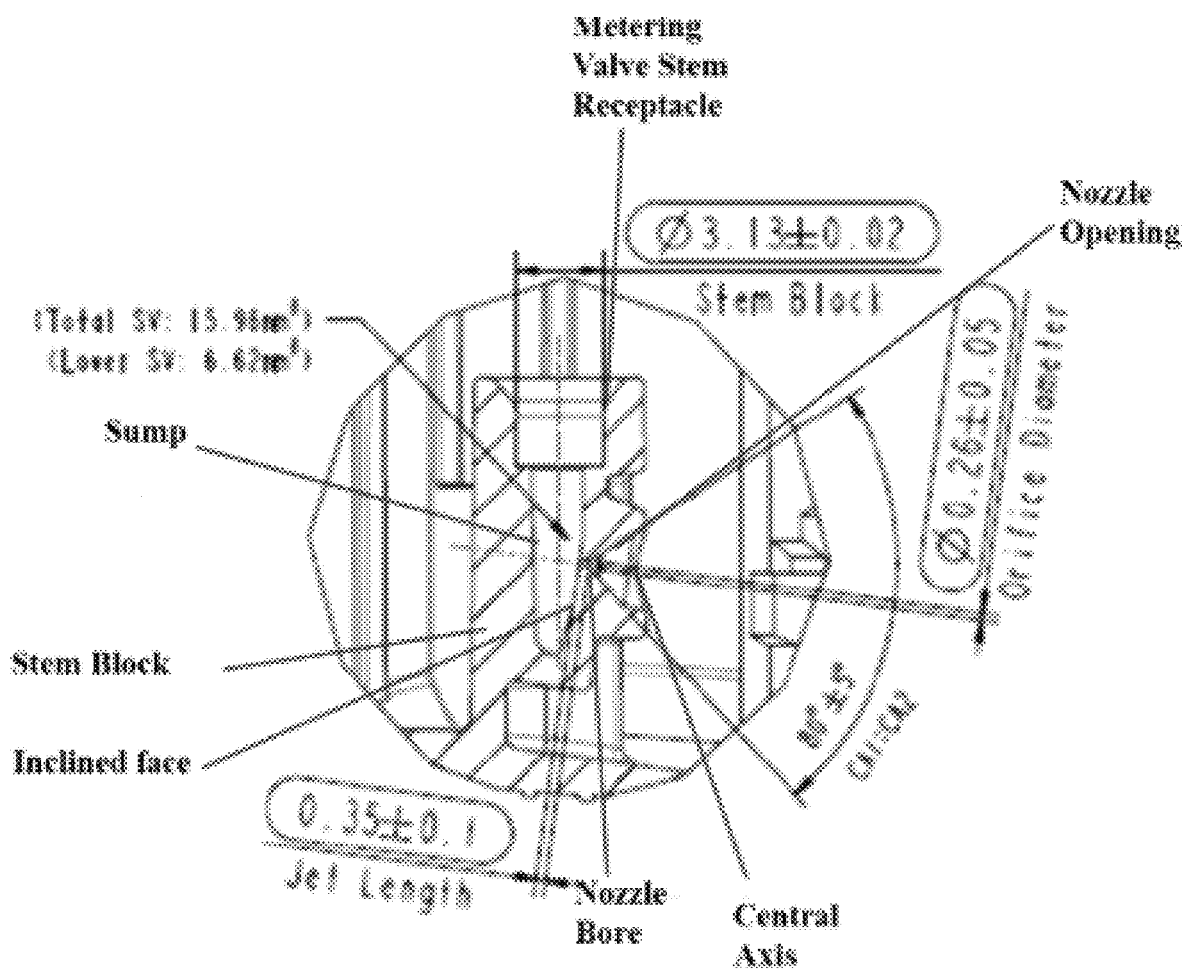
FIG. 4 is an enlarged view of a portion of an inhaler (e.g., of a stem block of the actuator) with a sump volume of about 15.96 mm$^3$, orifice diameter of about 0.26 mm, and jet length of about 0.35 mm.
Figure 5:
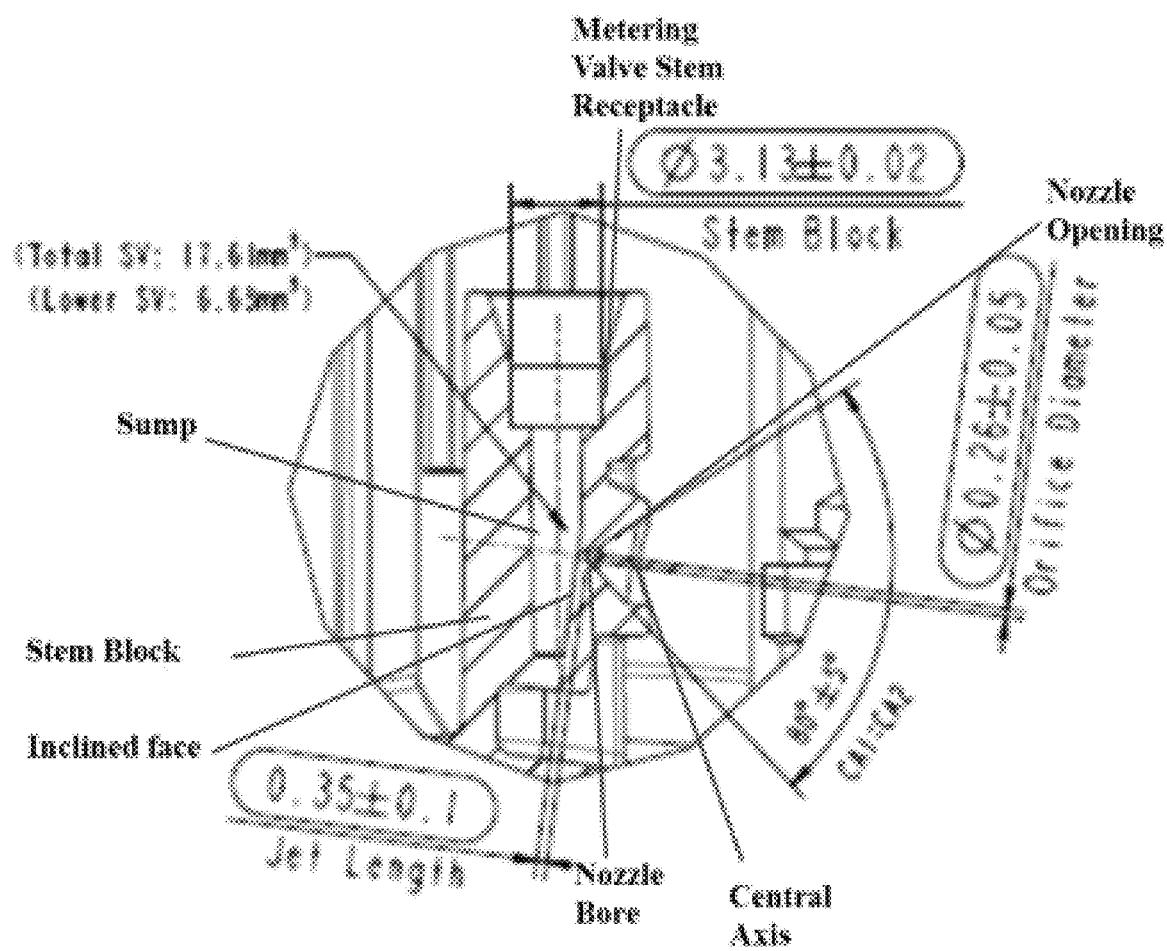
FIG. 5 is an enlarged view of a portion of an inhaler (e.g., of a stem block of the actuator) with a sump volume of about 17.61 mm$^3$, orifice diameter of about 0.26 mm, and jet length of about 0.35 mm.
Figure 6:
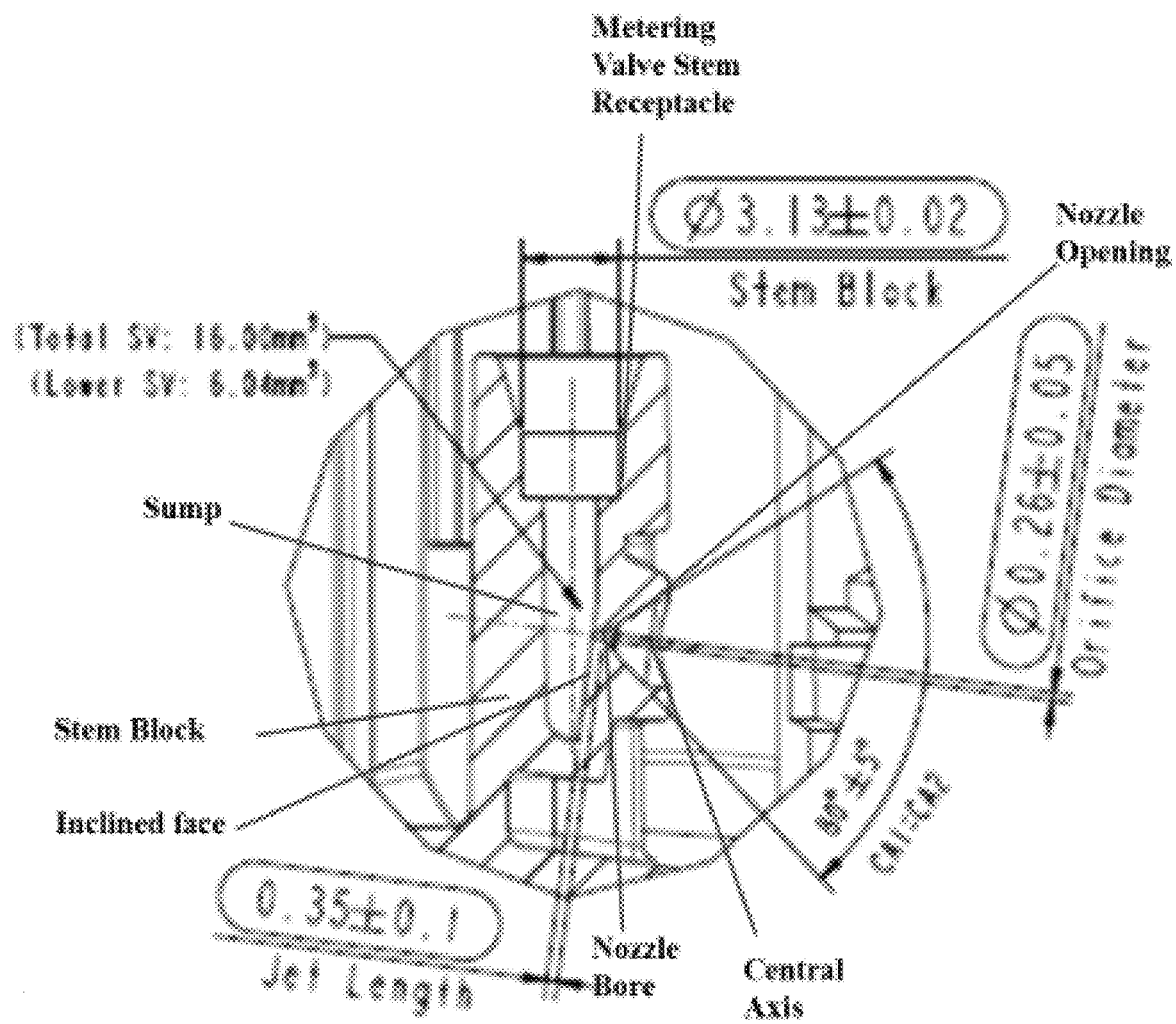
FIG. 6 is an enlarged view of a portion of an inhaler (e.g., of a stem block of the actuator) with a sump volume of about 16 mm$^3$, orifice diameter of about 0.26 mm, and jet length of about 0.35 mm.
Figure 7:
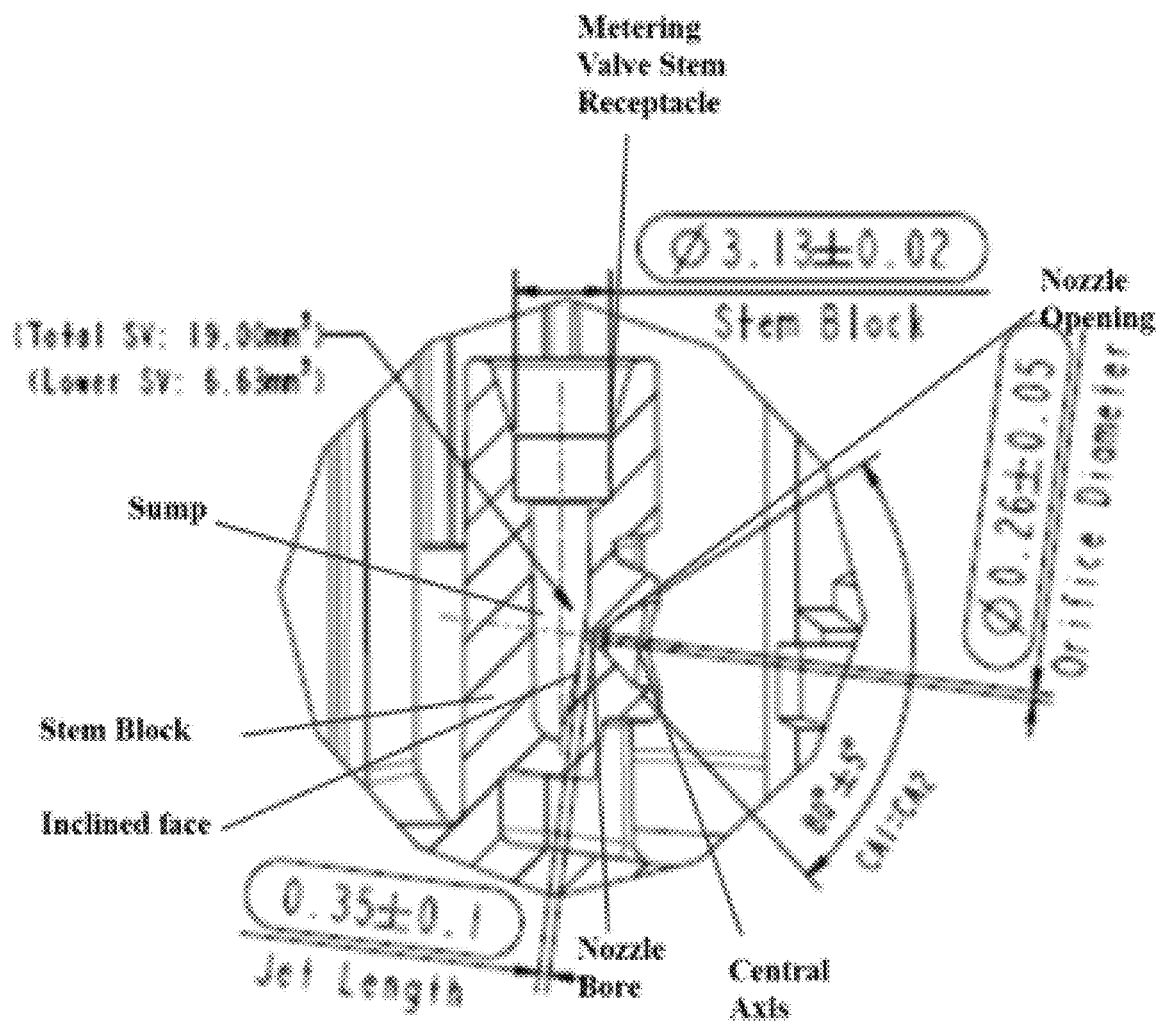
FIG. 7 is an enlarged view of a portion of an inhaler (e.g., of a stem block of the actuator) with a sump volume of about 19 mm$^3$, orifice diameter of about 0.26 mm, and jet length of about 0.35 mm.
Figure 8:
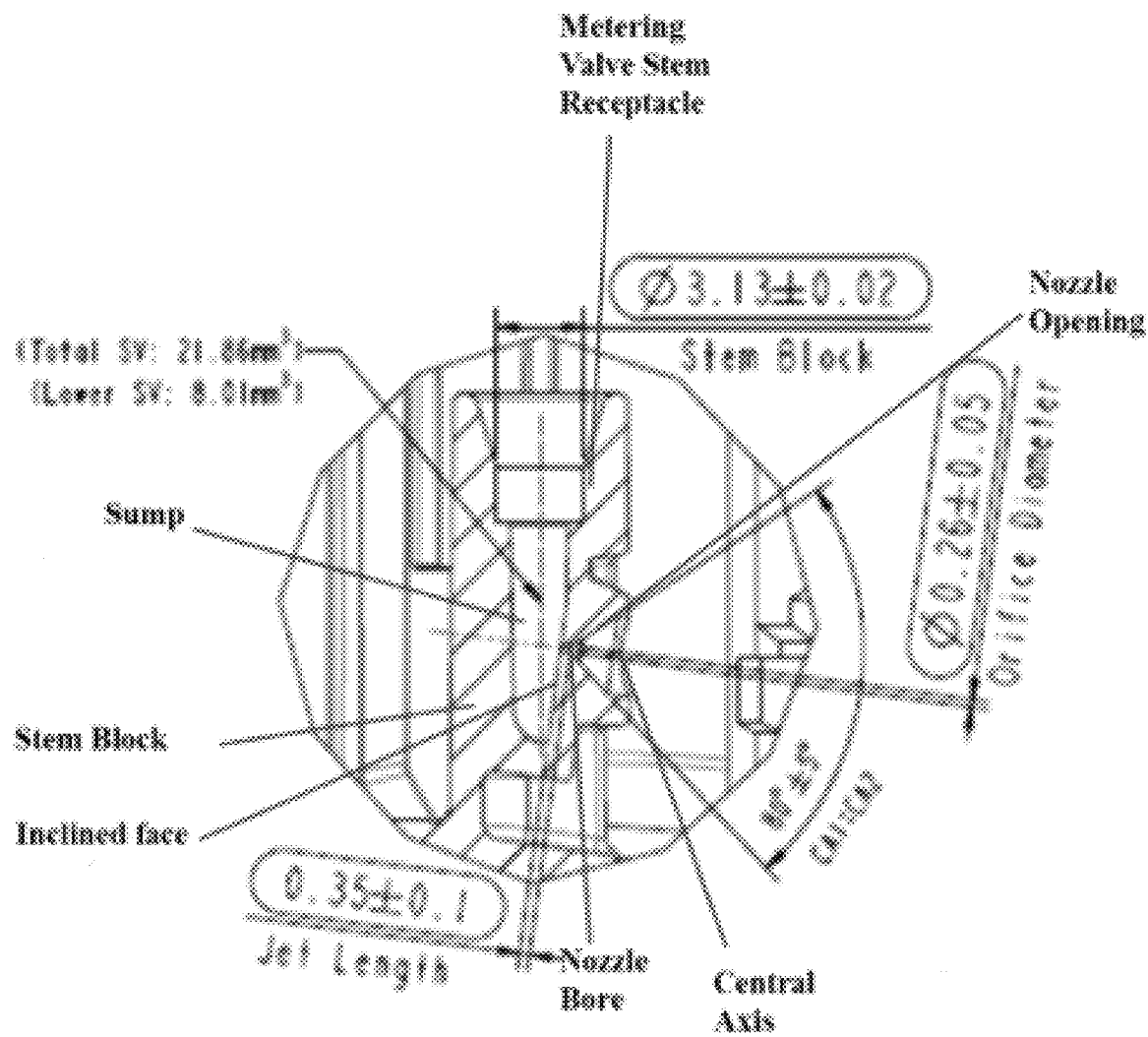
FIG. 8 is an enlarged view of a portion of an inhaler (e.g., of a stem block of the actuator) with a sump volume of about 21.86 mm$^3$, orifice diameter of about 0.26 mm, and jet length of about 0.35 mm.
Figure 9:
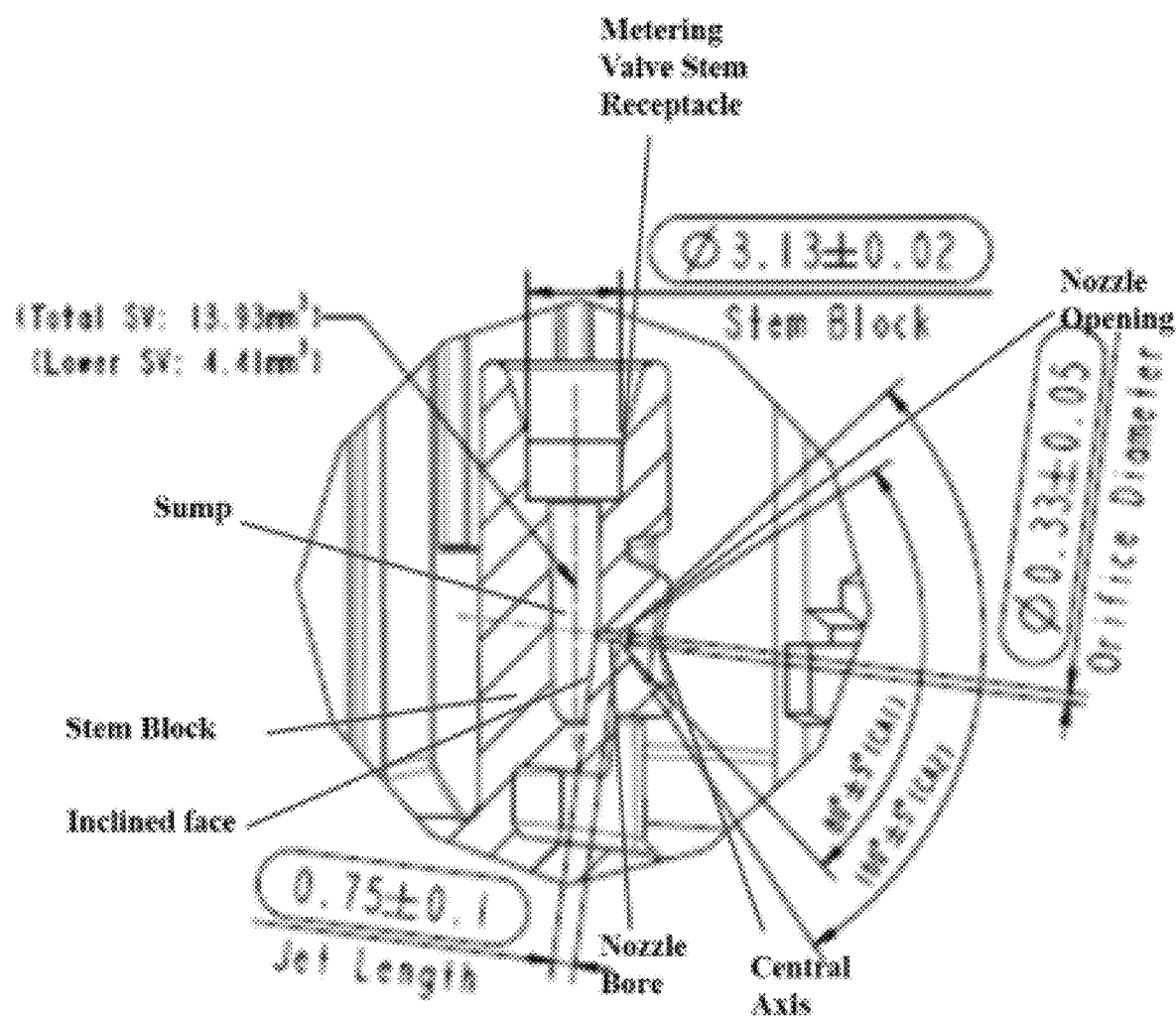
FIG. 9 is an enlarged view of a portion of an inhaler (e.g., of a stem block of the actuator) with a sump volume of about 13.93 mm$^3$, orifice diameter of about 0.33 mm, and jet length of about 0.75 mm.
Figure 10:
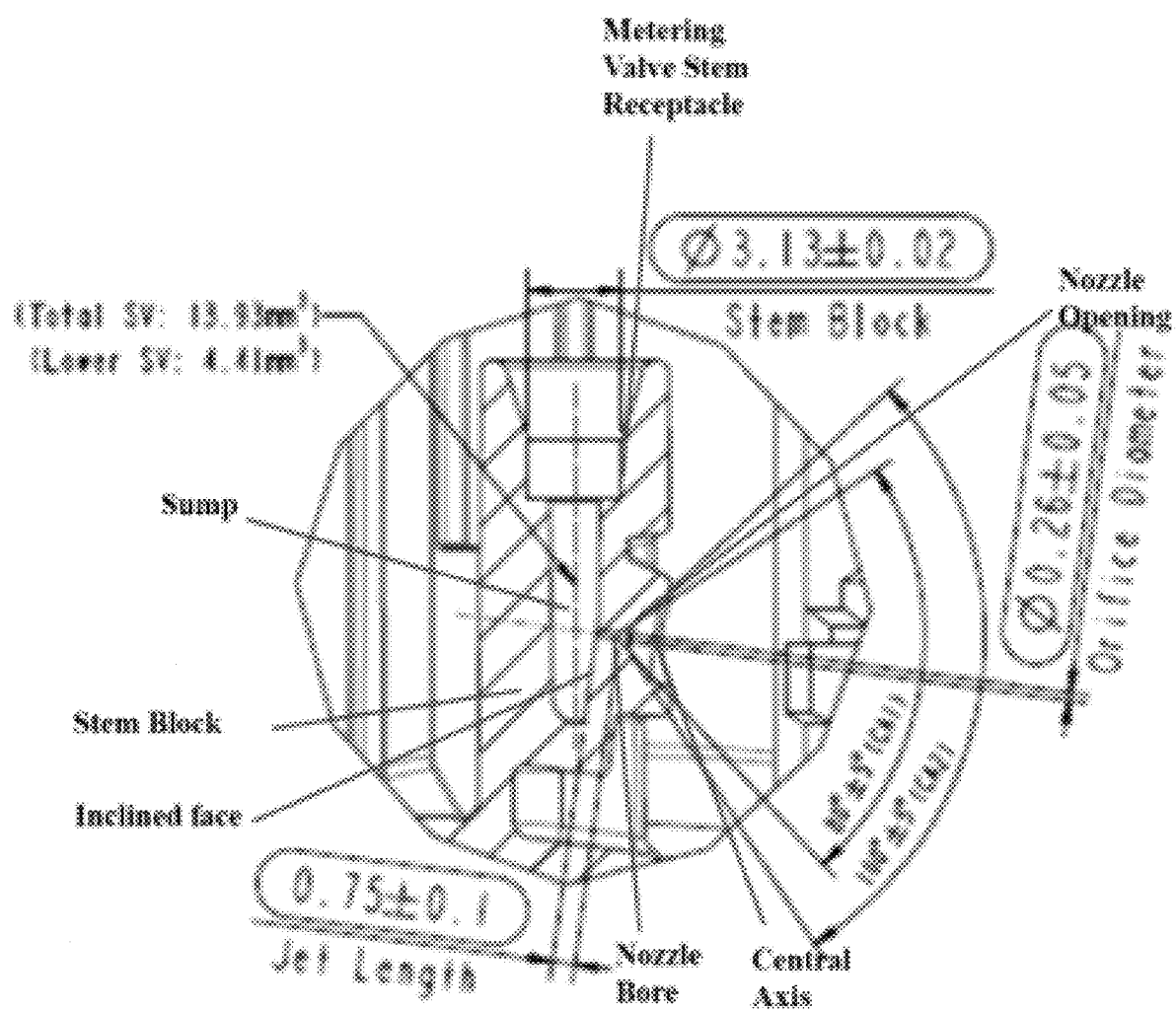
FIG. 10 is an enlarged view of a portion of an inhaler (e.g., of a stem block of the actuator) with a sump volume of about 13.93 mm$^3$, orifice diameter of about 0.26 mm, and jet length of about 0.75 mm.

It is also to be understood that the terminology used herein is for describing particular embodiments only, and is not intended to be limiting. The term singular forms "a," "an" and "the" include plural references unless the context clearly dictates otherwise.

The term "pharmaceutical solution composition" means a pharmaceutical composition of a medicament suitable for aerosol administration wherein the medicament and excipients are completely dissolved. The pharmaceutical solution composition shall be used interchangeably with "inhalable composition" or "inhalable solution composition".

The term "stable pharmaceutical solution composition" or "stable inhalable composition" means an aerosol solution composition which exhibits any one or all of the following conditions: (i) the composition exhibits substantial chemical stability over a period of time such that it is suitable for aerosol inhalation administered by pressurized meter dose inhalers used for delivery of the drug to the respiratory tract, and/or (ii) the composition is substantially maintaining the mass median aerodynamic diameter (MMAD) and the fine particle dose.

In some embodiments, a "stable" aerosol is one in which the fine particle fraction (FPF) or fine particle dose (FPD) of the aerosol does not change more than 15% or changes between 5-15% in 1 month from the initial FPF or FPD when measured at ambient conditions (e.g., about 25° C. and a relative humidity (RH) of about 60%) or at accelerated conditions (e.g., at about 40° C. and about 75% RH). In another embodiment, a "stable pharmaceutical composition" is one in which the pharmaceutical composition has a single unknown maximum impurity in an amount of not more than 1% and a total impurity content of not more than 3%, for instance, when stored for 6 months at accelerated conditions at 40° C.±2° C. and 75%±5% RH.

In a preferred embodiment, ipratropium is present in any of the compositions described herein as ipratropium bromide monohydrate.

The term "active ingredient" (used interchangeably with "active" or "active agent" or "drug" or "medicament") as used herein include ipratropium. The active ingredient may be present in respirable solution form in the composition.

There are a number of routinely applied analytical tests for aerosol dosage forms for inhalation administration, including mass median aerodynamic diameter (MMAD), fine particle dose or fraction (FPD or FPF), and geometric standard deviation (GSD).

The term "mass median aerodynamic diameter (MMAD)" as used herein signifies the aerodynamic diameter at which half of the aerosolized drug mass lies below the stated diameter. Solid particles and/or droplets in an aerosol composition can be characterized by their MMAD.

The term "fine particle fraction (FPF)" as used herein refers to mass fraction of the dose emitted in this size range by a particular inhaler as described in the present specification.

The fine particle fraction (FPF) is normally defined as the FPD divided by the emitted dose (ED) and expressed as a percentage. A higher fine particle fraction indicates improved delivery efficiency due to a significant decrease in throat deposition. Having a higher fine particle fraction may also allow a lower amount of total drug dose needed to achieve equivalent therapeutic benefits.

The term "fine particle dose" (also referred as FPD) is the total mass of active agent which is emitted from the device following actuation which is present in an aerodynamic particle size smaller than a defined limit.

The Geometric Standard Deviation (GSD) is a measure of the spread of an aerodynamic particle size distribution. Typically, GSD is calculated as follows:

$$GSD = (d_{84}/d_{16})^{1/2}$$

where $d_{84}$ and $d_{16}$ represent the diameters at which 84% and 16% of the aerosol mass are contained, respectively, in diameters less than these diameters.

The expansion chamber volume, which is comprised of the volume of the actuator sump and the internal valve stem bore.

As used herein, the term "about" when referring to a number or a numerical range means that the number or numerical range referred to is an approximation within experimental variability (or within statistical experimental error), and the number or numerical range may vary from, for example, between 1% and 15% of the stated number or numerical range.

The term "respiratory disorder" as used herein includes pulmonary diseases involving any obstructive or destructive conditions of respiratory tract, vascular diseases and infectious diseases which may or may not be acute or chronic and communicable or non-communicable. The respiratory disorder may be chronic obstructive pulmonary disease (COPD), asthma, reactive airways dysfunction syndrome (RADS), acute respiratory distress syndrome (ARDS), irritant induced asthma, occupational asthma, sensory hyperreactivity, airway (or pulmonary) inflammation, or multiple chemical sensitivity.

As used herein, the term "dose indicator" is intended to refer to both dose counter devices and dose indicator devices.

Various analytical tests including, but not limited to, MMAD, FPD, FPF and GSD can be measured by various instruments such as Anderson Cascade Impactor.

The stable aerosol solution compositions of ipratropium bromide can be obtained by dissolving ipratropium bromide in a homogeneous system comprising HFA-134(a), ethanol, and either an inorganic acid or an organic acid. The particular type and amount of acid added to the system will define the level of acidity which is critical in obtaining a stable solution composition.

Thus, the present invention provides stabilized aerosol solution composition comprising a medicament, a HFA propellant, a cosolvent, and a stabilizer is selected from an inorganic acid, an organic acid and any combinations of any of the foregoing. A small amount of water (up to about 5% by weight) may also be present in the propellant/cosolvent system.

Suitable HFA propellants are those which, when mixed with the cosolvent(s), form a homogeneous propellant system in which a therapeutically effective amount of the medicament can be dissolved. The HFA propellant must be toxicologically safe and must have a vapor pressure which is suitable to enable the medicament to be administered via a pressurized MDI. Additionally, the HFA propellant must be compatible with the components of the MDI device (such as containers, valves, and sealing gaskets, etc.) which is employed to administer the medicament. Preferred HFA propellants are 1,1,1,2-tetrafluoroethane (HFA-134(a)) and 1,1,1,2,3,3,3-heptafluoropropane (HFA-227). HFA-134(a) is particularly preferred. Other examples of HFA propellants are HFA-32 (difluoromethane), HFA-143(a) (1,1,1-trifluoroethane), HFA-134 (1,1,2,2-tetrafluoroethane), and HFA-152a (1,1-difluoroethane).

It will also be apparent to those skilled in the art that, although the use of a single HFA propellant is preferred, a mixture of two or more HFA propellants, may be employed in the aerosol solution composition of the present invention.

A substantially non-aqueous HFA propellant/cosolvent system is preferred. Water may be present in small amounts as an impurity in the HFA propellant/cosolvent system, may be introduced during the manufacturing process or may permeate into the system through the valve or valve/container seals or gaskets. If desired, small amounts of vehicle such as water may be added (up to about 5% by weight) to the HFA/propellant system, to aid in manufacturing.

If desired, pharmaceutically acceptable excipients can be included in the aerosol solution composition of the present invention. For example, a soluble surface active agent can be added in order to improve the performance of valve systems employed in the MDI devices used for the aerosol administration of the composition. Examples of preferred surface active agents are oleic acid, sorbitan trioleate, lecithin, and isopropylmyristate. Other excipients are: (a) antioxidants, for example ascorbic acid and tocopherol; (b) taste masking agents, for example, menthol, sweeteners, and artificial or natural flavors; and (c) pressure modifying agents, for example, n-pentane, iso-pentane, neo-pentane, and n-hexane.

In general, the medicament is present in an amount from about 0.001 to 10 percent by weight of the total weight of the composition. An amount of from about 0.01 to 1.0 percent by weight of the total weight of the composition is preferred.

The medicaments used in the present invention may be in the form of either the free base or a pharmaceutically acceptable, non-toxic, salt thereof. Suitable salts are well known in the pharmaceutical and medicinal arts. The preferred salt according to present invention is bromide.

The medicaments used in the present invention may be in the form of either the hydrate or anhydrous form. The preferred form according to present invention is monohydrate.

The medicaments used in the present invention may be in the form of either the hydrate or anhydrous form. The preferred form according to present invention is monohydrate.

The medicaments used in the present invention is in the micronized form. The micronized particles of the drug are characterized by a selected, narrow, and well defined particle size distribution in such a way that: i) no more than 50% of said particles have a volume diameter [$D_{50}$] less than 10 microns, preferably less than 9 microns, preferably less than 8 microns, preferably less than 8 microns, less than 6 microns; ii) at least 90% of said particles [$D_{90}$] have a volume diameter less than 30 microns, preferably less than 25 microns, preferably less than 20 microns; and iii) at least 100% of said particles [$D_{100}$] have a volume diameter less than 300 microns, preferably less than 250 microns, preferably less than 200 microns.

The chemical nature of the medicament defines the nature of the cosolvent, which may be any one of a number of organic solvents that are toxicologically safe and amenable to MDI solution composition. By "cosolvent" is meant any solvent which is miscible in the composition in the amount desired and which, when added provides a composition in which the medicament can be dissolved in therapeutically effective amounts. Examples of cosolvents that contain hydroxyl functions (or other functions) capable of interacting with the medicament(s) in the composition are: alcohols, for example, ethyl alcohol and isopropyl alcohol; glycols for example, propylene glycol, polyethylene glycols, polypropylene glycols, glycol ethers, and block copolymers of oxyethylene and oxypropylene; and other substances, for example, glycerol, polyoxyethylene alcohols, and polyoxtethylene fatty acid esters.

A preferred cosolvent according to this invention is ethyl alcohol (ethanol).

The function of the cosolvent is to increase the solubility of the medicament and the excipients in the composition. Thus, the amount of cosolvent present in the composition defines the maximum amount of medicament and excipients that can be dissolved at a particular temperature.

The selection of the stabilizer in the aerosol solution composition of this invention depends on the medicament used and the stabilizer concentration needed to effect an acceptable rate of degradation of the medicament. The stabilizer may be any inorganic or mineral acid, for example, hydrochloric acid, sulfuric acid, nitric acid, or phosphoric acid, or the like. The stabilizer may also be selected from the group of acids known to those skilled in the art as organic acids, which are in most cases considered to be weak acids relative to the inorganic acids. Representative of this group and preferred in this invention are ascorbic acid and citric acid, although other organic acids may also be suitable. The stabilizer provides stability against degradation or decomposition of the medicament resulting largely from interaction of the medicament with the cosolvent and/or water present in the solution composition. However, according to this invention, citric acid is the most preferred stabilizer because of MDI component compatibility.

According to this invention an aerosol solution composition comprising a particular medicament may be formulated using acids selected from either of the above groups.

The methods used to introduce the acid into the composition may include: (1) the direct addition of the inorganic or organic acid; (2) the addition of the medicament as an acidic salt thereby generating the correct acidity level in situ, and (3) combinations of (1) and (2). Appropriate salts for introducing the medicament into the composition will be apparent to those skilled in the art.

It is known that aerosol solution composition of ipratropium bromide in HFA-134(a) and about 35% ethanol exhibit significant decomposition of the ipratropium bromide when stored at 50° C. The decomposition can be attributed to oxidation, chemical dehydration, hydrolysis and esterification. However, tropic acid ethyl ester is the chief degradation product. This ester can be formed by the direct reaction of ethanol with ipratropium bromide or by hydrolysis of ipratropium bromide followed by esterification of tropic acid with ethanol. Addition of 1% water reduced the decomposition due to dehydration. Carrying out the reaction under nitrogen atmosphere reduced the oxidation products.

FIG. 1 shows an MDI device according to aspects of the disclosure. A MDI device mainly comprises of three major components: a canister (for example aluminium or stainless steel such as SS 316 L and SS 904 L) where the composition resides; a metering valve, which allows a metered quantity of the composition to be dispensed with each actuation; and an actuator (or mouthpiece) which allows the user to operate the device and directs the aerosol into the user's lungs.

A MDI typically includes a canister made from aluminum or steel and an actuator. The canister houses a pharmaceutical (therapeutic) composition, which generally includes one or more active ingredients and a liquefied gas propellant. The composition may also include various other components, such as stabilizing excipients.

The canister includes the metering valve at one end. The metering valve is typically contained within a neck portion of the canister and includes a valve stem extending outwardly from the canister through which valve stem the pharmaceutical composition is dispensed.

The canister may be positioned in an actuator. The MDI device of FIG. 1 can be equipped with any of the actuator described herein and shown in FIGS. 2*a*-10. The actuator can include an approximately cylindrical body portion into which the canister is received and a discharge nozzle or sleeve, often called a "stem block," which communicates with a discharge opening. The discharge opening may be a mouthpiece opening or nosepiece opening, as appropriate to the delivery mode and is configured accordingly. When the canister is fully received in the actuator body portion to achieve its operational configuration, a portion of the length of the valve stem of the metering valve is received in the actuator discharge sleeve (which may be referred to interchangeably herein as a metering valve stem receptacle).

According to some aspects, the actuator can include a mouthpiece through which the inhalable composition can be dispensed and a stem block. The stem block can include a metering valve stem receptacle and a sump. In some embodiments, the sump can optionally have a generally triangular cross section, though other shapes are possible. The sump can include an inclined face with a proximal end and a distal end. In embodiments, the inclined face can directly interface with the metering valve stem receptacle. In other embodiments, the inclined face can be spaced distally from the metering valve stem receptacle. The stem block can also include a nozzle bore in fluid communication with the sump. The nozzle bore can have a central axis. In embodiments, the central axis can extend generally orthogonally from the inclined face between the proximal end of the inclined face and the distal end of the inclined face. The stem block can also include a conical nozzle opening in fluid communication with the nozzle bore and with the mouthpiece.

The sump volume, the diameter of the nozzle bore (orifice diameter), and the length of the nozzle bore (jet length) can be dimensioned to dispense a target amount of the inhalable composition (e.g., ipratropium bromide and HFA-134a propellant) per actuation. For example, in some embodiments, the sump has a volume that is about 11.55 mm$^3$ to about 22.25 mm$^3$, the nozzle bore has a diameter that is about 0.2 mm to about 0.5 mm, and the nozzle bore has a length that is about 0.25 mm to about 0.95 mm. Other dimensions for the sump volume, the diameter of the nozzle bore (orifice diameter), and the length of the nozzle bore (jet length) are disclosed throughout this disclosure.

For actuation of the MDI to dispense the unit dose, the user presses the base of the canister to urge the canister forwardly into the actuator. The shoulder or ledge of the discharge sleeve prevents forward movement of the valve stem relative to the actuator. The valve stem is thus moved along a line of action relative to the container. In other words, the valve stem is depressed partially into the container. This depression of the valve stem results in the discharge of the unit dose of the pharmaceutical composition through the valve stem and the stem block and consequently through the discharge opening for delivery to the patient. On release of the canister by the user, the valve stem is biased to return to its initial position.

In one embodiment, an actuator with a spray orifice aperture of from about 550 μm to about 650 μm may be used in the invention. The choice of actuator plays an important role in drug delivery which in turn is dependent on various parameters like spray orifice aperture, jet length, stem block, sump volume and the like.

The stable aerosol inhalation composition or stable pharmaceutical composition of the present invention does not clog any part of the inhaler device, e.g., valve.

The canister may be made of any suitable material such as aluminium, aluminium alloys, stainless steel, tin, plastic or glass which may be coated or uncoated. Some drugs tend to adhere to the inner surfaces, i.e., walls of the canister, and may clog metering valves of the device components. This can lead to the patient getting significantly less than the prescribed amount of the active agent upon each activation of the MDI. Coating the inner surface of the container with a suitable polymer can reduce this adhesion problem. Suitable coatings include fluorocarbon copolymers such as FEP-PES (fluorinated ethylene propylene and polyethersulphone) and PFA-PES (perfluoroalkoxyalkane and polyethersulphone), epoxy and ethylene. Alternatively, the inner surfaces of the canister may be anodized, plasma treated or plasma coated.

In an embodiment, the aerosol inhalation composition is filled into an aluminum canister whose inner surface is coated with a fluorocarbon polymer. The canister is fitted with a valve, preferably with a metering valve suitable to deliver a specific amount of the composition each time the device is actuated. Once a valve is crimped into place, the canisters must be able to adequately seal the propellant without leaking. In one embodiment, the metering valve delivers from about 45 μl to about 65 μl of the composition. A gasket is also used between the metering valve and the canister to prevent leakage of the composition. In an embodiment, preferably, the gasket used is rubber or polymer gasket. In another embodiment, preferably, the gasket used is ethylene propylene diene monomer rubber (EPDM). In another embodiment, the gasket is elastomeric cyclic-olefin-copolymer (COC)

The aerosol composition of the present invention may be placed in the canister using conventional methods such as cold filling or back filling or pressure filling leaving a sufficient "head space". The filled canisters are then placed in a suitable housing to complete the drug delivery device. In operation, when the canister is moved relative to the housing such that the metering valve is depressed, a fixed amount of composition is released initially through the metering valve and then though the cylindrical passage of the housing. As the propellant vaporizes, the drug is suspended in air. Patients then inhale the suspended drug, thereby effecting pulmonary drug administration.

In an embodiment, the stable aerosol inhalation composition as described herein is filled in a canister with the capacity of from about 10 mL to about 22 mL wherein the filled volume of the composition is from about 8 mL to about 20 mL. The actuator used for dispensing the drug delivers the volume of from about 45 μl to about 65 μl per actuation. Patient may use one or two puffs once or twice daily as per the requirement or severity of disease.

A typical dose counter has a numerical display, indexes forward with each actuation, and has a discrete display that is often preferred by patients over a dose indicator. Dose indicators take many forms, but often count in multiples (for example, 10 or 20) or use colours to display remaining doses. They often do not index every count and require some patient interpretation of the display. The appeal of dose indicators tends to be the larger display and lower cost, although they are not considered by patients to be as accurate as a dose counter.

In another embodiment, the propellant or HFA propellant (also known as hydrofluorocarbon or HFC propellant) should be toxicologically safe and have a vapor pressure in order to enable the medicament to be administered via a pressurized MDI. Suitable HFA propellants include, but are not limited to, 1,1,1,2-tetrafluoroethane (HFA-134(a)), 1,1,1,2,3,3,3-heptafluoropropane (HFA-227), HFA-32 (difluoromethane), HFA-143(a) (1,1,1-trifluoroethane), HFC-134 (1,1,2,2-tetrafluoroethane), and HFA-152a (1,1-difluoroethane). In a preferred embodiment, the propellant is selected from 1,1,1,2-tetrafluoroethane (HFA-134(a)) and 1,1,1,2,3,3-heptafluoropropane (HFA-227). In a more preferred embodiment, the HFA propellant is HFA-134(a).

The pharmaceutical composition can be placed into the canister by any known method. The two most common methods are cold filling and pressure filling. In a cold filling process, the pharmaceutical composition is chilled to an appropriate temperature, which is typically −50° C. to −60° C. for composition that use propellant 1,1,1,2-tetrafluoroethane, 1,1-difluoroethane, 1,1,1,2,3,3,3-heptafluoropropane, or a combination thereof, and added to the canister. The metered dose valve is subsequently crimped onto the canister. When the canister warms to ambient temperature, the vapor pressure associated with the pharmaceutical composition increases thereby providing an appropriate pressure within the canister.

In a pressure filling method, the metered dose valve can be first crimped onto the empty canister. Subsequently, the composition can be added through the valve into the container by way of applied pressure. Alternatively, all of the non-volatile components can be first added to the empty canister before crimping the valve onto the canister. The propellant can then be added through the valve into the canister by way of applied pressure.

The invention in one embodiment relates a MDI device comprising i) a canister fitted with a metering valve comprising a stable inhalable composition comprising ipratropium bromide, ii) an actuator and iii) optionally, a dose indicator; wherein the actuator has sump volume in range of from about 11.55 $mm^3$ to about 22.25 $mm^3$.

The invention in one embodiment relates a MDI device comprising i) a canister fitted with a metering valve comprising a stable inhalable composition comprising ipratropium bromide, ii) an actuator and iii) optionally, a dose indicator; wherein the actuator has sump volume in range of from about 11.55 $mm^3$ to about 12.8 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume in range of from about 12.8 $mm^3$ to about 14.5 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume in range of from about 14.6 $mm^3$ to about 18 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume in range of from about 18.1 $mm^3$ to about 22.25 $mm^3$.

Another embodiment relates a MDI device comprising i) a canister fitted with a metering valve comprising a stable inhalable composition comprising ipratropium bromide, ii) an actuator and iii) optionally, a dose indicator; wherein the actuator has sump volume selected from the group consisting of about 11.5 $mm^3$, about 12.1 $mm^3$, about 12.5 $mm^3$, about 12.6 $mm^3$, about 12.7 $mm^3$, about 12.8 $mm^3$, about 12.9 $mm^3$, about 13 $mm^3$, about 13.1 $mm^3$, about 13.2 $mm^3$, about 13.3 $mm^3$, about 13.4 $mm^3$, about 13.5 $mm^3$, about 13.6 $mm^3$, about 13.7 $mm^3$, about 13.8 $mm^3$, about 13.9 $mm^3$, about 13.93 $mm^3$, about 14 $mm^3$, about 14.1 $mm^3$, about 14.2 $mm^3$, about 14.3 $mm^3$, about 14.4 $mm^3$, about 14.5 $mm^3$, about 14.6 $mm^3$, about 14.7 $mm^3$, about 14.8 $mm^3$, about 14.9 $mm^3$, about 15 $mm^3$, about 15.1 $mm^3$, about 15.2 $mm^3$, about 15.3 $mm^3$, about 15.4 $mm^3$, about 15.5 $mm^3$, about 15.6 $mm^3$, about 15.7 $mm^3$, about 15.8 $mm^3$, about 15.9 $mm^3$, about 15.96 $mm^3$, about 16 $mm^3$, about 16.1 $mm^3$, about 16.2 $mm^3$, about 16.3 $mm^3$, about 16.4 $mm^3$, about 16.5 $mm^3$, about 16.6 $mm^3$, about 16.7 $mm^3$, about 16.8 $mm^3$, about 16.9 $mm^3$, about 17 $mm^3$, about 17.1 $mm^3$, about 17.2 $mm^3$, about 17.3 $mm^3$, about 17.4 $mm^3$, about 17.5 $mm^3$, about 17.6 $mm^3$, about 17.61 $mm^3$, about 17.7 $mm^3$, about 17.8 $mm^3$, about 17.9 $mm^3$, about 18 $mm^3$, about 18.1 $mm^3$, about 18.2 $mm^3$, about 18.3 $mm^3$, about 18.4 $mm^3$, about 18.5 $mm^3$, about 18.6 $mm^3$, about 18.7 $mm^3$, about 18.8 $mm^3$, about 18.9 $mm^3$, about 19 $mm^3$, about 19.1 $mm^3$, about 19.2 $mm^3$, about 19.3 $mm^3$, about 19.4 $mm^3$, about 19.5 $mm^3$, about 19.6 $mm^3$, about 19.7 $mm^3$, about 19.8 $mm^3$, about 19.9 $mm^3$, about 20 $mm^3$, about 20.1 $mm^3$, about 20.2 $mm^3$, about 20.5 $mm^3$, about 21.0 $mm^3$, about 21.2 $mm^3$, about 21.3 $mm^3$, about 21.4 $mm^3$, about 21.5 $mm^3$, about 21.6 $mm^3$, about 21.7 $mm^3$, about 21.8 $mm^3$, about 21.86 $mm^3$, about 21.9 $mm^3$, about 22.25 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 12.1 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 12.6 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 12.7 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 13.93 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 15.3 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 16.0 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 17.61 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 19.0 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 20.2 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has sump volume of about 21.86 $mm^3$.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter in range of from about 0.2 mm to about 0.5 mm Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter in range of from about 0.22 mm to about 0.4 mm Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter in range of from about 0.22 mm to about 0.34 mm Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter in range of from about 0.35 mm to about 0.5 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter selected from group consisting of about 0.20 mm, about 0.21 mm, about 0.22 mm, about 0.23 mm, about 0.24 mm, about 0.25 mm, about 0.26 mm, about 0.27 mm, about 0.28 mm, about 0.29 mm, about 0.30 mm, about 0.31 mm, about 0.32 mm, about 0.33 mm, about 0.34 mm, about 0.35 mm, about 0.36 mm, about 0.37 mm, about 0.38 mm, about 0.39 mm, about 0.4 mm, about 0.41 mm, about 0.42 mm, about 0.43 mm, about 0.44 mm, about 0.45 mm, about 0.46 mm, about 0.47 mm, about 0.48 mm, about 0.49 mm, and about 0.5 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter of about 0.22 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter of about 0.25 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter of about 0.26 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter of about 0.28 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter of about 0.29 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has orifice diameter of about 0.33 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.25 mm to about 0.95 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.25 mm to about 0.45 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.46 mm to about 0.64 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length is about 0.65 mm to about 0.85 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length selected from group consisting of about 0.20 mm, about 0.21 mm, about 0.22 mm, about 0.23 mm, about 0.24 mm, about 0.25 mm, about 0.26 mm, about 0.27 mm, about 0.28 mm, about 0.29 mm, about 0.3 mm, about 0.31 mm, about 0.32 mm, about 0.33 mm, about 0.34 mm, about 0.35 mm, about 0.36 mm, about 0.37 mm, about 0.38 mm, about 0.39 mm, about 0.4 mm, about 0.41 mm, about 0.42 mm, about 0.43 mm, about 0.44 mm, about 0.45 mm, about 0.46 mm, about 0.47 mm, about 0.48 mm, about 0.49 mm, about 0.5 mm, about 0.51 mm, about 0.52 mm, about 0.53 mm, about 0.54 mm, about 0.55 mm, about 0.56 mm, about 0.57 mm, about 0.6 mm, about 0.65 mm, about 0.7 mm, about 0.72 mm, about 0.73 mm, about 0.74 mm, about 0.75 mm, about 0.76 mm, about 0.77 mm, about 0.78 mm, about 0.79 mm, about 0.8 mm, about 0.85 mm, about 0.90 mm and about 0.95 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length of about 0.31 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length of about 0.33 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length of about 0.35 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length of about 0.5 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has jet length of about 0.75 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter in range of from about 1 mm to about 5 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter in range of from about 2 mm to about 4 mm.

Another embodiment relates to a MDI device comprising i) a canister fitted with a metering valve comprising a stable inhalable composition comprising ipratropium bromide, ii)

an actuator and iii) optionally, a dose indicator; wherein the actuator has sump diameter selected from group consisting of about 1 mm, about 1.5 mm, about 2 mm, about 2.5 mm, about 3 mm, about 3.5 mm, about 4 mm, about 4.5 mm, and about 5 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter selected from group consisting of about 1.1 mm, about 1.2 mm, about 1.3 mm, about 1.4 mm, about 1.5 mm, about 1.6 mm, about 1.8 mm, about 1.9 mm, about 2 mm, about 2.1 mm, about 2.2 mm, about 2.3 mm, about 2.4 mm, about 2.5 mm, about 2.6 mm, about 2.7 mm, about 2.8 mm, about 2.9 mm and about 3 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter of about 1.80 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter of about 2.20 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter of about 1.95 mm.

Another embodiment relates to a MDI device comprising i) a canister fitted with a metering valve comprising a stable inhalable composition comprising ipratropium bromide, ii) an actuator and iii) optionally, a dose indicator; wherein the actuator has sump diameter of about 1.87 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the stem block of valve has length in range of from about 1 mm to about 5 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the stem block of valve has length in range of from about 2 mm to about 4 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the stem block of valve has length in range of from about 3 mm to about 4 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the stem block of valve has length in range of from about 3.1 mm to about 3.3 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the stem block of valve has length selected from group consisting of about 1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.6 mm, about 2.7 mm, about 2.8 mm, about 2.9 mm, about 3 mm, about 3.1 mm, about 3.2 mm, about 3.3 mm, about 3.4 mm, about 3.5 mm, about 3.6 mm, about 3.7 mm, about 3.8 mm, about 3.9 mm, about 4 mm, about 4.1 mm, about 4.2 mm, about 4.3 mm, about 4.4 mm, about 4.5 mm, about 4.6 mm, about 4.7 mm, about 4.8 mm, about 4.9 mm, and about 5 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width in range of from about 10 mm to about 50 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width in range of from about 15 mm to about 45 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width in range of from about 20 mm to about 40 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width in range of from about 20 mm to about 30 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width selected from group consisting of about 11 mm, about 12 mm, about 13 mm, about 14 m, about 15 mm, about 16 mm, about 1 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, and about 50 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 20 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 21 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 22 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner height is about 10 mm to about 50 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner height in range of from about 15 mm to about 45 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner height in range of from about 20 mm to about 40 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner height in range of from about 20 mm to about 30 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner height selected from group consisting of about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, and about 50 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner height selected from group consisting of about 10.5 mm, about 11.5 mm, about 12.5 mm, about 13.5 mm, about 14.5 m, about 15.5 mm, about 16.5 mm, about 17.5 mm, about 18.5 mm, about 19.5 mm, and about 20.5 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 13.70 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 14.65 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 15.4 mm.

Another embodiment relates to a MDI metered dose inhaler device comprising i) a canister fitted with a metering valve comprising a stable inhalable composition comprising ipratropium bromide, ii) an actuator and iii) optionally, a dose indicator; wherein the mouth piece has inner width of about 16.5 mm.

Another embodiment relates to an actuator which has one or more of following features:
 a. Sump volume in range of from about 11.55 $mm^3$ to about 22.25 $mm^3$;
 b. Spray orifice diameter of from about 0.2 mm to about 0.5 mm;
 c. Jet length of from about 0.25 mm to about 0.95 mm, and
 d. Cone angle of about 70° to about 110°.

Another embodiment relates to an actuator which has one or more of following features:
 a. Sump volume in range of from about 11.55 $mm^3$ to about 12.8 $mm^3$;
 b. Spray orifice diameter of from about 0.22 mm to about 0.34 mm;
 c. Jet length of from about 0.25 mm to about 0.45 mm, and
 d. Cone angle of from about 80° to about 100°.

Another embodiment relates to an actuator which has one or more of following features:
 a. Sump volume in range of from about 12.8 $mm^3$ to about 14.5 $mm^3$;
 b. Spray orifice diameter of from about 0.22 mm to about 0.34 mm;
 c. Jet length of from about 0.30 mm to about 0.85 mm, and
 d. Cone angle of from about 80° to about 100°.

Another embodiment relates to an actuator which has one or more of following features:
 a. Sump volume in range of from about 14.6 $mm^3$ to about 18 $mm^3$;
 b. Spray orifice diameter of from about 0.22 mm to about 0.34 mm;
 c. Jet length of from about 0.30 mm to about 0.85 mm, and
 d. Cone angle of from about 80° to about 100°.

Another embodiment relates to an actuator which has one or more of following features:
 a. Sump volume in range of from about 18.1 $mm^3$ to about 22.25 $mm^3$;
 b. Spray orifice diameter of from about 0.22 mm to about 0.34 mm;
 c. Jet length of from about 0.30 mm to about 0.85 mm, and
 d. Cone angle of from about 80° to about 1008.

Another embodiment relates to an actuator which has one or more of following features:
 a) Sump volume of about 12.1 $mm^3$;
 b) Jet length is about 0.38 mm;
 c) Spray orifice diameter is about 0.28 mm, and
 d) Cone angle of from about 80° to about 100°.

Another embodiment relates to an actuator which has one or more of following features:
 a) Sump volume of about 12.6 $mm^3$;
 b) Jet length is about 0.31 mm;
 c) Spray orifice diameter is about 0.22 mm, and
 d) Cone angle of from about 80° to about 100°.

Another embodiment relates to an actuator which has one or more of following features:
 a) Sump volume of about 12.6 $mm^3$;
 b) Jet length is about of 0.33 mm;
 c) Spray orifice diameter of about 0.22 mm, and
 d) Cone angle of from about 80° to about 100°.

Another embodiment relates to an actuator which has one or more of following features:
a) Sump volume of about 12.6 mm³;
b) Jet length is about 0.3 5 mm;
c) Spray orifice diameter is about 0.25 mm, and
d) Cone angle of about 80° to about 100°.

Another embodiment relates to an actuator which has one or more of following features:
a) Sump volume of about 12.6 mm³;
b) Jet length is about 0.35 mm;
c) Spray orifice diameter is about 0.28 mm, and
d) Cone angle of about 80° to about 100°.

Another embodiment relates to an actuator which has one or more of following features:
a) Sump volume of about 12.7 mm³;
b) Jet length is about 0.35 mm;
c) Spray orifice diameter is about 0.28 mm, and
d) Cone angle of about 80° to about 100°.

Another embodiment relates to an actuator which has one or more of following features:
a) Sump volume of about 13.93 mm³;
b) Jet length is about 0.75 mm;
c) Spray orifice diameter is about 0.26 mm, and
d) Cone angle of about 80° to about 100€.

Another embodiment relates to an actuator which has one or more of following features:
a) Sump volume of about 13.93 mm³;
b) Jet length is about 0.75 mm;
c) Spray orifice diameter of about 0.29 mm, and
d) Cone angle of about 80° to about 100°.

Another embodiment relates to an actuator which has one or more of following features:
a) Sump volume of about 13.93 mm³;
b) Jet length is about 0.29 mm;
c) Spray orifice diameter is about 0.33 mm, and
d) Cone angle of about 80° to about 100°.

Another embodiment relates to an actuator which has one or more of following features:
a) Sump volume of about 15.3 mm³;
b) Jet length is about 0.35 mm;
c) Spray orifice diameter is about 0.28 mm, and
d) Cone angle of about 80° to about 100°.

Another embodiment relates to an actuator which has one or more of following features:
a) Sump volume of about 15.96 mm³;
b) Jet length is about 0.35 mm;
c) Spray orifice diameter of about 0.26 mm, and
d) Cone angle of about 80° to about 100°.

Another embodiment relates to an actuator which has one or more of following features:
a) Sump volume of about 16 mm³;
b) Jet length is about 0.35 mm;
c) Spray orifice diameter is about 0.26 mm, and
d) Cone angle of about 80° to about 100°.

Another embodiment relates to an actuator which has one or more of following features:
a) Sump volume of about 16 mm³;
b) Jet length in the range of about of 0.50 mm;
c) Spray orifice diameter of about 0.26 mm, and
d) Cone angle of about 80° to about 100°.

Another embodiment relates to an actuator which has one or more of following features:
a) Sump volume of about 16 mm³;
b) Jet length in the range of about of 0.75 mm;
c) Spray orifice diameter of about 0.26 mm, and
d) Cone angle of about 80° to about 100°.

Another embodiment relates to an actuator which has one or more of following features:
a) Sump volume of about 16 mm³;
b) Jet length in the range of about of 0.75 mm;
c) Spray orifice diameter of about 0.33 mm, and
d) Cone angle of about 80° to about 100°.

Another embodiment relates to an actuator which has one or more of following features:
a) Sump volume of about 16 mm³;
b) Jet length in the range of about of 0.75 mm;
c) Spray orifice diameter of about 0.29 mm, and
d) Cone angle of about 80° to about 100°.

Another embodiment relates to an actuator which has one or more of following features:
a) Sump volume of about 17.62 mm³;
b) Jet length in the range of about of 0.35 mm;
c) Spray orifice diameter of about 0.26 mm, and
d) Cone angle of about 80° to about 100°.

Another embodiment relates to an actuator which has one or more of following features:
a) Sump volume of about 19 mm³;
b) Jet length in the range of about of 0.35 mm;
c) Spray orifice diameter of about 0.26 mm, and
d) Cone angle of about 80° to about 100°.

Another embodiment relates to an actuator which has one or more of following features:
a) Sump volume of about 20.2 mm³;
b) Jet length in the range of about of 0.35 mm;
c) Spray orifice diameter of about 0.28 mm, and
d) Cone angle of about 80° to about 100°.

Another embodiment relates to an actuator which has one or more of following features:
a) Sump volume of about 21.86 mm³;
b) Jet length in the range of about of 0.35 mm;
c) Spray orifice diameter of about 0.26 mm, and
d) Cone angle of about 80° to about 1008.

Another embodiment relates to a stable pharmaceutical solution composition comprising (a) ipratropium bromide; (b) cosolvent; (c) stabilizer, (d) vehicle and (e) HFA as propellant.

Another embodiment relates to a MDI device comprising i) a canister fitted with a metering valve comprising a stable inhalable composition comprising ipratropium bromide, (a) ipratropium bromide; (b) cosolvent; (c) stabilizer, (d) vehicle and (e) HFA as a propellant; ii) an actuator; and iii) optionally, a dose indicator; wherein the canister is stainless steel canister.

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein the pharmaceutical composition provides a mean median aerodynamic diameter (MMAD) of ipratropium bromide is about 2 to about 4 μm.

Another embodiment relates to a MDI device comprising i) a canister fitted with a metering valve comprising a stable inhalable composition comprising ipratropium bromide, (a) ipratropium bromide; (b) cosolvent; (c) stabilizer, (d) vehicle and (e) HFA as a propellant; ii) an actuator; and iii) optionally, a dose indicator, wherein the pharmaceutical composition provides a mean median aerodynamic diameter (MMAD) of ipratropium bromide is about 0.5 to about 1.5 μm.

Another embodiment relates a MDI device comprising i) a canister fitted with a metering valve comprising a stable pharmaceutical solution composition comprising (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water, (e) about 50% w/w to 99% w/w of HFA-134a; ii) an actuator; and iii) optionally, a dose indicator, wherein the actuator has sump volume in range of from about 11.55 mm$^3$ to about 22.25 mm$^3$, spray orifice diameter in range of from about 0.2 mm to about 0.5 mm, jet length is about 0.25 mm to about 0.95 mm, cone angle of about 70° and 110°, and stem block length in range of from about 1 mm to about 5 mm.

Another embodiment relates a MDI device comprising i) a canister fitted with a metering valve comprising a stable pharmaceutical solution composition comprising (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water, (e) about 50% w/w to 99% w/w of HFA-134a; ii) an actuator; and iii) optionally, a dose indicator, wherein the actuator has sump volume in range of from about 11.55 mm$^3$ to about 12.8 mm$^3$, spray orifice diameter in range of from about 0.22 mm to about 0.34 mm, jet length is about 0.25 mm to about 0.45 mm, cone angle of about 80° and 100°, and stem block length in range of from about 2 mm to about 4 mm.

Another embodiment relates a MDI device comprising i) a canister fitted with a metering valve comprising a stable pharmaceutical solution composition comprising (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water, (e) about 50% w/w to 99% w/w of HFA-134a; ii) an actuator; and iii) optionally, a dose indicator, wherein the actuator has sump volume in range of from about 12.8 mm$^3$ to about 14.5 mm$^3$, spray orifice diameter in range of from about 0.22 mm to about 0.34 mm, jet length is about 0.30 mm to about 0.85 mm, cone angle of about 80° and 100°, and stem block length in range of from about 2 mm to about 4 mm.

Another embodiment relates a MDI device comprising i) a canister fitted with a metering valve comprising a stable pharmaceutical solution composition comprising (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water, (e) about 50% w/w to 99% w/w of HFA-134a; ii) an actuator; and iii) optionally, a dose indicator, wherein the actuator has sump volume in range of from about 14.6 mm$^3$ to about 18 mm$^3$, spray orifice diameter in range of from about 0.22 mm to about 0.34 mm, jet length is about 0.30 mm to about 0.85 mm, cone angle of about 80° and 100°, and stem block length in range of from about 2 mm to about 4 mm.

Another embodiment relates a MDI device comprising i) a canister fitted with a metering valve comprising a stable pharmaceutical solution composition comprising (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water, (e) about 50% w/w to 99% w/w of HFA-134a; ii) an actuator; and iii) optionally, a dose indicator, wherein the actuator has sump volume in range of from about 18.1 mm$^3$ to about 22.25 mm$^3$, spray orifice diameter in range of from about 0.22 mm to about 0.34 mm, jet length is about 0.30 mm to about 0.85 mm, cone angle of about 80° and 100°, and stem block length in range of from about 2 mm to about 4 mm.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 12.1 mm$^3$, spray orifice diameter of about 0.28 mm, jet length of about 0.38 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 12.6 mm$^3$, spray orifice diameter of about 0.22 mm, jet length of about 0.31 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 12.6 mm$^3$, spray orifice diameter of about 0.22 mm, jet length of about 0.33 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 12.6 mm$^3$, spray orifice diameter of about 0.25 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 12.6 mm$^3$, spray orifice diameter of about 0.28 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 12.7 mm$^3$, spray orifice diameter of about 0.28 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 13.93 mm$^3$, spray orifice diameter of about 0.26 mm, jet length of about 0.75 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 13.93 mm$^3$, spray orifice diameter of about 0.29 mm, jet length of about 0.75 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 13.93 mm$^3$, spray orifice diameter of about 0.29 mm, jet length of about 0.33 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 15.3 mm$^3$, spray orifice diameter of about 0.28 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 15.96 mm$^3$, spray orifice diameter of about 0.26 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 16 mm$^3$, spray orifice diameter of about 0.26 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 16 mm$^3$, spray orifice diameter of about 0.26 mm, jet length of about 0.50 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 16 mm$^3$, spray orifice diameter of about 0.26 mm, jet length of about 0.75 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 16 mm$^3$, spray orifice diameter of about 0.33 mm, jet length of about 0.75 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 16 mm$^3$, spray orifice diameter of about 0.29 mm, jet length of about 0.75 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 17.62 mm$^3$, spray orifice diameter of about 0.26 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 19 mm$^3$, spray orifice diameter of about 0.26 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 20 mm$^3$, spray orifice diameter of about 0.28 mm, jet length of about 0.35 mm, and cone angle of about 80° and 100°.

Another embodiment relates a MDI device comprising i) a canister fitted with a metering valve comprising a stable pharmaceutical solution composition comprising (a) about 0.0375% w/w of ipratropium bromide monohydrate; (b) about 0.004% w/w of citric acid; (c) about 15% w/w of dehydrated alcohol, (d) about 0.5% w/w of water, (e) about 84.45% w/w of HFA-134a; ii) an actuator; and iii) optionally, a dose indicator; wherein the actuator has sump volume of about 21.86 mm$^3$, spray orifice diameter of about 0.26 mm, jet length of about 0.35 mm, and cone angle of about 80° and 100°.

The amount of drug in an aerosol solution composition that can be delivered through the valve of an MDI will depend on the active ingredient concentration in the composition and the metering volume of the valve. Commonly used valve sizes are 25, 50, 63 and 100 µl.

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein the pharmaceutical composition is stable at 40° C.±2° C. and 75%±5% relative humidity (RH) for 6 months.

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein the pharmaceutical composition has total impurity not more than 3%, when stored for 6 months at accelerated conditions at 40° C.±2° C. and 75%±5% RH.

In one embodiment, the composition when stored for stored for 6 months at accelerated conditions at 40° C.±2° C. and 75%±5% relative humidity in a MDI device contains has one or more of the following properties:
  (i) the composition contains not more than 0.5% of Ipratropium impurity A ((1R,3,5S,8r)-3-Hydroxy-8-isopropyl-8-methyl-8-azabicyclo[3.2.1]octan-8-ium bromide; Also known as (1R,3r, 5S, 8r)-3-Hydroxy-8-methyl-8-(1-methylethyl)-8-azoniabicyclo[3.2.1]octane, bromide);
  (ii) the composition contains not more than 1% of Ipratropium impurity B ((1R,3,5S,8s)-3-[(3-Hydroxy-2-phenylpropanoyl)oxy]-8-isopropyl-8-methyl-8-azabicyclo[3.2.1]octan-8-ium bromide; Also known as (1R, 3r, 5S,8s)-3-[[(2RS)-3-Hydroxy-2-phenylpropanoyl]oxy]-8-methyl-8-(1-methylethyl)-8-zoniabicyclo[3.2.1]octane, bromide);
  (iii) the composition contains not more than 1% of Ipratropium impurity C (3-Hydroxy-2-phenylpropionic acid; also known as (2RS)-3-Hydroxy-2-phenylpropanoic acid);
  (iv) the composition contains not more than 1% of phenylpropenic acid (2-phenylpropenoic acid (atropic acid));
  (v) the composition contains not more than 1% of Desmethyl ipratropium (N-isopropylnoatropium) chemically known as (1R,3r,5S)-8-Isopropyl-8-azabicyclo[3.2.1]octan-3-yl 3-hydroxy-2-phenylpropanoate; also known as (1R,3,5S)-8-(1-Methylethyl)-8-azabicyclo[3.2.1]oct-3-yl (2RS)-3-hydroxy-2-phenylpropanoate or N-isopropylnoratropinium)).

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein, the pharmaceutical composition provides a fine particle fraction (FPF) of ipratropium bromide is about 30% to about 75%.

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein, the pharmaceutical composition provides a fine particle fraction (FPF) of ipratropium bromide is about 15% to about 60%.

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein, the pharmaceutical composition provides a fine particle dose (FPD) of ipratropium bromide is about 15 µg to about 30 µg.

Another embodiment relates to a MDI device comprising i) a canister fitted with a metering valve comprising a stable inhalable composition comprising (a) ipratropium bromide; (b) cosolvent; (c) stabilizer, (d) vehicle and (e) HFA as a propellant; ii) an actuator; and iii) optionally, a dose indicator; wherein, the pharmaceutical composition provides a fine particle dose (FPD) of ipratropium bromide is about 3 µg to about 10 µg.

In yet another aspect, any of the compositions described herein, when delivered through a MDI device provides a spray pattern having mean ovality ratio 1.0 to 1.5 and mean area about 300 mm$^2$ to about 690 mm$^2$ at 3 cm distance and mean ovality ratio 1.0 to 1.5 and mean area about 450 mm$^2$ to about 990 mm$^2$ at 6 cm distance.

In another aspect, any of the compositions described herein, when delivered through a MDI device provides a plume width in range of from about 22 mm to about 49 mm and plume angle in range of from about 20° to 45°.

In another embodiment, stable pharmaceutical solution composition of ipratropium bromide of the present invention has water content in range of from about 0.40% to 0.95% and ethanol content is about 80% to 120% of stated amount.

In another embodiment, stable pharmaceutical solution composition of ipratropium bromide of the present invention is prepared and filled in the appropriate canister. In one embodiment, the filling method comprises the following steps:
  1. Ethanol, purified water and anhydrous citric acid were mixed in manufacturing vessel.
  2. Ipratropium bromide was added into solution from step-1 and mixed well.
  3. The propellant, HFA-134a was added in the manufacturing vessel followed by mixing and re-circulation of the mixture.
  4. The solution obtained in step-3 was filled into crimped canisters provided with a suitable valve.

The following examples are provided to enable one skilled in the art to practice the invention and are merely illustrative of the invention. The examples should not be read as limiting the scope of the invention.

EXAMPLES

Example (1) Discloses Range of MDI Composition Containing Ipratropium Bromide

TABLE 1

| Ingredients | Composition (% w/w) |
| --- | --- |
| Ipratropium bromide monohydrate | 0.001-2.5 |
| Anhydrous citric acid | 0.0001-1.0 |
| Dehydrated alcohol | 1.0-50.0 |
| Purified aater | 0.01-5.0 |
| 1,1,1,2-tetrafluoroethane (HFA-134a) | 50.0-99.0 |

Manufacturing Process:
1. Ethanol, purified water and anhydrous citric acid were mixed in manufacturing vessel.
2. Ipratropium bromide was added into solution from step-1 and mixed well.
3. The propellant, HFA-134a was added in the manufacturing vessel followed by mixing and re-circulation of the mixture.
4. The solution obtained in step-3 was filled into crimped canisters provided with a suitable valve.

Example (2) MDI Composition Containing Ipratropium Bromide (17 mcg/actuation)

TABLE 2

| Ingredients | Composition (% w/w) |
| --- | --- |
| Ipratropium bromide monohydrate | 0.0375 |
| Anhydrous citric acid | 0.0040 |
| Dehydrated alcohol | 15.0041 |
| Purified water | 0.5001 |
| 1,1,1,2-tetrafluoroethane (HFA-134a) | 84.4513 |
| Total | 100% |

Manufacturing Process:
1. Ethanol, purified water and anhydrous citric acid were mixed in manufacturing vessel.
2. Ipratropium bromide was added into solution from step-1 and mixed well.
3. The propellant, HFA-134a was added in the manufacturing vessel followed by mixing and re-circulation of the mixture.
4. The solution obtained in step-3 was filled into crimped stainless steel canisters provided with a 50 μl valve.

TABLE 3

Stability Data for Example 2 at 40° C. and 75% RH

| Test | Specification Limit | Stability Data at 40° C. and 75% RH | | |
| --- | --- | --- | --- | --- |
| | | Initial | 3 Month | 6 Month |
| FPD | Not less than 3.2 μg and No more than 9.8 μg. | 6.853 | 6.646 | 6.513 |
| FPF (%) | 15% to 60% | 36.510 | 38.85 | 34.932 |
| MMAD (μm) | 0.5-1.2 μm | 0.633 | 0.57 | 0.883 |
| Assay (%) | Not less than 90% and not more than 110% of the stated amount v | 99.25 | 97.5 | 98.1 |
| Mean ovality ratio | 1.0 to 1.5 at 3 cm distance | 1.319 | — | — |
| | 1.0 to 1.5 at 6 cm distance | 1.152 | — | — |
| Mean area | 300 mm$^2$ to 690 mm$^2$ at 3 cm distance | 448.2 | — | — |
| | 450 mm$^2$ to 990 mm$^2$ at 6 cm distance | 696.0 | — | — |
| Water content | 0.40% to 0.95% | 0.54 | 0.56 | 0.59 |
| Ethanol content | 80% and 120% of the stated amount | 102.4 | 101.2 | 100 |
| Plume width | 22 mm to 49 mm | 35.86 | — | — |
| Plume angle | 20° to 45° | 33.23 | — | — |
| Ipratropium impurity A | NMT 0.5% | NP | NP | NP |
| Ipratropium impurity C | NMT 1.0% | ND | ND | ND |
| Ipratropium impurity D | NMT 1.0% | ND | ND | ND |
| Ipratropium impurity B | NMT 1.0% | ND | ND | ND |
| Phenylpropenic acid | NMT 1.0% | ND | ND | ND |
| Single max. unspecified impurity | NMT 0.1% | 0.0 | 0.02 | 0.02 |
| Total Impurities | NMT 3.0% | 0.00 | 0.04 | 0.03 |

*ND: Not Detected
NP: Not Present

Although the invention herein has been described with reference to particular embodiments, it is to be understood that these embodiments are merely illustrative of the principles and application of the present invention. It is therefore to be understood that numerous modifications may be made to the illustrative embodiments and that other arrangements may be devised without departing from the spirit and scope of the present invention as described above.

All publications, patents, and patent applications cited in this application are herein incorporated by reference to the same extent as if each individual publication, patent, or patent application was specifically and individually indicated to be incorporated herein by reference.

We claim:
1. A metered dose inhaler for delivering ipratropium bromide, the metered dose inhaler comprising:
　a canister comprising an inhalable composition of ipratropium bromide and HFA-134a propellant;
　a metering valve fitted to and in fluid communication with the canister; and
　an actuator that holds the canister and the metering valve; the actuator comprising:
　　a mouthpiece through which the inhalable composition is configured to be dispensed; and
　　a stem block comprising:
　　　a metering valve stem receptacle;
　　　a sump comprising an inclined face with a proximal end and a distal end;

a nozzle bore in fluid communication with the sump, the nozzle bore has a central axis that extends generally orthogonally from the inclined face between the proximal end of the inclined face and the distal end of the inclined face; and a conical nozzle opening in fluid communication with the nozzle bore and with the mouthpiece; wherein:

the sump has a volume that is about 11.55 mm$^3$ to about 22.25 mm$^3$, the nozzle bore has a diameter that is about 0.2 mm to about 0.5 mm, the nozzle bore has a length that is about 0.25 mm to about 0.95 mm, and the metered dose inhaler is configured to eject the inhalable composition in a spray pattern 6 cm away from the metered dose inhaler, the spray pattern having a mean area between 450 mm$^2$ and 990 mm$^2$, inclusive.

2. The metered dose inhaler as claimed in claim 1, wherein the volume of the sump is about 12.1 mm$^3$ to about 17.6 mm$^3$.

3. The metered dose inhaler as claimed in claim 1, wherein the volume of the sump is selected from the group consisting of about 12.1 mm$^3$, about 12.6 mm$^3$, about 12.7 mm$^3$, about 13.93 mm$^3$, about 15.3 mm$^3$, about 16 mm$^3$, about 17.61 mm$^3$, about 19.6 mm$^3$, about 20.2 mm$^3$, and about 21.86 mm$^3$.

4. The metered dose inhaler as claimed in claim 1, wherein the diameter of the nozzle bore is about 0.22 mm to about 0.34 mm.

5. The metered dose inhaler as claimed in claim 1, wherein the diameter of the nozzle bore is selected from the group consisting of about 0.22 mm, about 0.25 mm, about 0.26 mm, about 0.28 mm, about 0.29 mm, and about 0.33 mm.

6. The metered dose inhaler as claimed in claim 1, wherein the length of the nozzle bore is about 0.30 mm to about 0.95 mm.

7. The metered dose inhaler as claimed in claim 1, wherein the length of the nozzle bore is selected from the group consisting of about 0.31 mm, about 0.33 mm, about 0.35 mm, about 0.5 mm, and about 0.75 mm.

8. The metered dose inhaler as claimed in claim 1, wherein the conical nozzle opening has cone angle of about 70° to 110°.

9. The metered dose inhaler as claimed in claim 1, wherein the inhalable composition provides a fine particle dose of ipratropium bromide in a range of from about 3 to about 10 μg.

10. The metered dose inhaler as claimed in claim 1, wherein the inhalable composition, when ejected from the metered dose inhaler, has a plume width of about 22 mm to 49 mm and plume angle of about 20° to 45°.

11. The metered dose inhaler as claimed in claim 1, wherein:

the spray pattern is a second spray pattern and the metered dose inhaler is configured to eject the inhalable composition in a first spray pattern 3 cm away from the metered dose inhaler, the first spray pattern and the second spray pattern each having a mean ovality ratio between 1.0 and 1.5, inclusive, and the first spray pattern having a mean area between about 300 mm$^2$ and about 690 mm$^2$.

12. The metered dose inhaler as claimed in claim 1, wherein the canister is made of at least one material selected from the group consisting of aluminium, aluminium alloys, stainless steel, tin, plastic and glass.

13. The metered dose inhaler as claimed in claim 1, wherein the metering valve is made of at least one material selected from the group consisting of low density polyethylene, chlorobutyl, acrylonitrile butadiene rubbers, butyl rubber, a polymer of ethylene propylene diene monomer (EPDM), neoprene or chloroprene or cyclic olefin copolymer.

14. The metered dose inhaler as claimed in claim 1, wherein the sump defines an opening facing the metering valve stem receptacle, and a center of the opening is aligned with a center of the metering valve stem receptacle.

15. A metered dose inhaler comprising:

(i) a canister fitted with a metering valve comprising an inhalable composition of ipratropium bromide and HFA-134a propellant; and (ii) an actuator, wherein:

the actuator comprising at least one of:

a) a sump volume of about 11.55 mm$^3$ to about 22.25 mm$^3$, b) a spray orifice diameter of about 0.2 mm to about 0.5 mm, or c) a jet length of about 0.25 mm to about 0.95 mm, and the metered dose inhaler is configured to eject the inhalable composition in a spray pattern 6 cm away from the metered dose inhaler, the spray pattern having a mean area between 450 mm$^2$ and 990 mm$^2$, inclusive.

16. The metered dose inhaler as claimed in claim 15, wherein:

the actuator has a metering valve having stem block length of about 2 mm to 4 mm, the sump volume is between about 12.8 mm$^3$ to about 14.5 mm$^3$, the spray orifice diameter is between about 0.22 mm to about 0.34 mm, and the jet length is between about 0.30 mm to about 0.85 mm.

17. The metered dose inhaler as claimed in claim 15, wherein:

the sump volume is about 12.1 mm$^3$, the spray orifice diameter is about 0.28 mm, the jet length is about 0.38 mm, and the actuator further comprises a cone angle of about 80° and 100°.

18. The metered dose inhaler as claimed in claim 15, wherein:

the sump volume is about 12.6 mm$^3$, the spray orifice diameter is about 0.28 mm, the jet length is about 0.38 mm, and the actuator further comprises a cone angle of about 80° and 100°.

19. The metered dose inhaler as claimed in claim 15, wherein:

the sump volume is about 13.93 mm$^3$, the spray orifice diameter is about 0.29 mm, the jet length is about 0.75 mm, and the actuator further comprises a cone angle of about 80° and 100°.

20. The metered dose inhaler as claimed in claim 15, wherein:

the sump volume is about 21.86 mm$^3$, the spray orifice diameter is about 0.26 mm, the jet length is about 0.35 mm, and the actuator further comprises a cone angle of about 80° and 100°.

21. The metered dose inhaler as claimed in claim 15, wherein the inhalable composition is a stable pharmaceutical solution composition comprising: (a) about 0.0375% w/w of ipratropium bromide monohydrate; (b) about 0.004% w/w of citric acid; (c) about 15% w/w of dehydrated alcohol, (d) about 0.5% w/w of water, and (e) about 84.45% w/w of HFA-134a.

22. A metered dose inhaler comprising:
(i) a canister fitted with a metering valve comprising an inhalable composition of ipratropium bromide and HFA-134a propellant; and
(ii) an actuator, wherein:
the inhalable composition is a stable pharmaceutical solution comprising: (a) about 0.001% w/w to 2.5% w/w of ipratropium bromide; (b) about 0.001% w/w to 1% w/w of citric acid; (c) about 1% w/w to 50% w/w of dehydrated alcohol, (d) about 0.01% w/w to 5% w/w of water,
the actuator comprises:
  a) a sump volume of about 11.55 mm$^3$ to about 22.25 mm$^3$;
  b) a spray orifice diameter of about 0.2 mm to about 0.5 mm; and
  c) a jet length of about 0.25 mm to about 0.95 mm, and
the metered dose inhaler is configured to eject the inhalable composition in a spray pattern 6 cm away from the metered dose inhaler, the spray pattern having a mean area between 450 mm$^2$ and 990 mm$^2$, inclusive.

* * * * *